US006408342B1

(12) United States Patent
Moore et al.

(10) Patent No.: US 6,408,342 B1
(45) Date of Patent: Jun. 18, 2002

(54) COMMUNICATIONS FRAMEWORK FOR SUPPORTING MULTIPLE SIMULTANEOUS COMMUNICATIONS PROTOCOLS IN A DISTRIBUTED OBJECT ENVIRONMENT

(76) Inventors: Keith E. Moore, 3090 Mauricia Ave., Santa Clara, CA (US) 95051; Evan Kirshenbaum, 441 Bella Corte, Mountain View, CA (US) 94043

( * ) Notice: Subject to any disclaimer, the term of this patent is extended or adjusted under 35 U.S.C. 154(b) by 42 days.

(21) Appl. No.: 08/827,213

(22) Filed: Mar. 28, 1997

(51) Int. Cl.[7] .................................................. G06F 9/46
(52) U.S. Cl. ........................................ 709/330; 709/315
(58) Field of Search ................................ 709/300, 301, 709/303, 330, 328, 315, 316

(56) References Cited

U.S. PATENT DOCUMENTS

| | | | | |
|---|---|---|---|---|
| 5,218,699 A | * | 6/1993 | Brandle et al. | 395/650 |
| 5,307,490 A | * | 4/1994 | Davidson et al. | 395/650 |
| 5,499,343 A | * | 3/1996 | Pettus | 395/200.2 |
| 5,511,197 A | * | 4/1996 | Hill et al. | 395/700 |
| 5,526,491 A | * | 6/1996 | Wei | 395/200.09 |
| 5,539,909 A | * | 7/1996 | Tanaka et al. | 395/700 |
| 5,566,302 A | * | 10/1996 | Khalidi et al. | 395/200.9 |
| 5,758,186 A | * | 5/1998 | Hamilton et al. | 709/200 |
| 5,822,521 A | * | 10/1998 | Gartner et al. | 395/705 |
| 5,875,335 A | * | 2/1999 | Beard | 395/705 |
| 5,887,172 A | * | 3/1999 | Vasudevan et al. | 395/684 |

OTHER PUBLICATIONS

Grady Booch, Object Oriented Design with Applications, 1991, Benjamin/Cummings Publishing Company, p. 76–114.*
A. Birrell, et al, "Network Objects", ACM, pp. 217–230, Aug. 1993.*
H. Carr, et al, "Compiling Distributed C++", IEEE, pp. 496–503, 1993.*
A. Dave, et al, "Proxies, Application Interfaces, and Distributed Systems", IEEE, pp. 212–219, 1992.*
C. Enright, et al, "An Object Re-Engineering of the Remote Procedure Call, Streams and Transport Layer Interface", IEEE, pp. 602–605, 1995.*

* cited by examiner

Primary Examiner—Majid Banankhah
Assistant Examiner—Sue Lao

(57) ABSTRACT

A communication framework supporting multiple communications protocols. The communications framework having a remote procedure call class providing an interface for an apply method, the apply method referencing a remote object, an operation to be performed, and an argument list. The communications framework also having at least one remote procedure call transport deriving from the remote procedure call class, each remote procedure call transport providing an implementation for the apply method whose interface is provided by the remote procedure call class.

Other systems and methods are disclosed.

30 Claims, 14 Drawing Sheets

COMMUNICATIONS FRAMEWORK FOR SUPPORTING MULTIPLE SIMULTANEOUS COMMUNICATIONS PROTOCOLS IN A DISTRIBUTED OBJECT ENVIRONMENT

CROSS REFERENCE TO RELATED APPLICATIONS

The present application is related to the following applications:

| Title | Ser. No. | Attorney Docket No | Filing Date |
|---|---|---|---|
| MECHANISM AND METHOD FOR MERGING CACHED LOCATION INFORMATION IN A DISTRIBUTED OBJECT ENVIRONMENT | 08/828027 | 10960507 | March 27, 1997 |
| MECHANISM FOR RESOURCE ALLOCATION AND FOR DISPATCHING INCOMING CALLS IN A DISTRIBUTED OBJECT ENVIRONMENT | 08/825070 | 10960508 | March 27, 1997 |

DESCRIPTION OF THE RELATED ART

Field of the Invention

The present invention relates generally to distributed objects environments and, in particular, to a transport abstraction layer providing the capability of using multiple communications protocols in an application transparent fashion.

BACKGROUND OF THE INVENTION

Distributed and parallel systems form a very important segment of modern computing environments. Experience with such systems has exposed several requirements of system and component design which have historically been recognized only after a system has been deployed. A critical requirement (especially for systems with any longevity) is the need for the system and system components to be able to evolve over time.

By definition, a distributed system is one which contains components which need to communicate with one another. In most practical systems, however, many of these components will not be created "from scratch ". Components tend to have long lifetimes, be shared across systems, and be written by different developers, at different times, in different programming languages, with different tools. In addition, systems are not static—any large scale system will have components that must be updated, and new components and capabilities will be added to the system at different stages in its lifetime. The choice of platform, the level of available technology, and the current fashion in the programming community all conspire to create what is typically an integration and evolution nightmare.

The most common solution to this problem is to attempt to avoid it by declaring that all components in the system will be designed to a single distributed programming model and will use its underlying communication protocol. This approach tends not to work well for several reasons. First, by the time the decision has been made to use one model or protocol (which may be quite early in the life cycle of a system) there may already be existing components which there is a desire to use, but which do not support the selected model or protocol. Second, the choice of model and protocol may severely restrict other choices (e.g., the language in which a component is to be written or the platform on which it is to be implemented) due to the availability of support for the model.

Finally, such choices tend to be made in the belief that the ultimate model and protocol have finally been found, or at least that the current choice is sufficiently flexible to incorporate any future changes. That belief has, historically, been discovered to be unfounded—a situation which is not likely to change. Invariably, a small number of years down the road (and often well within the life of an existing system), a new "latest and greatest" model is invented, and the owner of the system is faced with the choice of adhering to the old model (which may leave the system unable to communicate with other systems and restrict the capabilities of new components) or upgrade the entire system to the new model. This approach is always an expensive option, and may in fact be intractable (for instance, it is not unheard of for systems to contain an investment of hundreds of man-years in "legacy" source code) or even impossible (as, for example, when the source code for a component is simply not available).

An alternative solution accepts the fact that a component or set of components may not speak the "common" protocol, and provide "proxy services" (or "protocol wrappers" or "gateways") between the communication protocols. Under this scheme, the communication is first sent to the gateway, which translates it into the non-standard protocol and forwards it on to the component. This technique typically gives rise to performance issues (due to message forwarding), resource issues (due to multiple in-memory message representations), reliability issues (due to the introduction of new messages and failure conditions), as well as security, location, configuration, and consistency problems (due to the disjoint mechanisms used by different communication protocols).

It is tempting to think that this problem is merely a temporary condition caused by the recent explosion in the number of protocols (and that things will stabilize soon) or that the problem is just an artifact of poor design in legacy components (and won't be so bad next time). However the problem of protocol evolution is intrinsic in building practical distributed systems. There will always be "better" protocols, domain specific motivations to use them, and "legacy" components and protocols that must be supported. Indeed, nearly any real distributed system will have at least three models: those of "legacy" components, the current standard, and the emerging "latest and greatest". The contents of these categories shift with time—today's applications and standard protocols will be tomorrow's legacy. Systems and components evolve along multiple dimensions:

Evolution of Component Interface

A component's interface may evolve to support new features. The danger is that this evolution will require all clients of the component to be updated. For reasons cited in the previous section, there must be a mechanism whereby old clients can continue to use the old interface, yet new clients can take advantage of the new features.

Evolution of Component Implementation

A component's implementation may evolve independently of the rest of the system. This may include the relocation of a component to a new hardware platform or the reimplementation of a component in a new programming language. There must be a mechanism which insulates other components from these changes in the implementation yet maintains the semantic guarantees promised by the interface.

Evolution of Inter-Communication Protocol

It is generally intractable to chose a single communication protocol for all components in the system as new protocols are attractive due to their performance, availability, security, and suitability to the application's needs. Each communication protocol has its own model of component location, component binding, and often a model of data/parameter representation. It must be possible to change or add communication protocols without rendering existing components inaccessible.

Evolution of Inter-Component Communication model/API

The programming models used to perform inter-component communication continue to evolve. Existing models change over time to support new data types which can be communicated and new communication semantics. At the same time, new programming models are frequently developed which are attractive due to their applicability to a particular application, their familiarity to programmers on a particular platform, or merely current fashion or corporate favor. It must be possible to implement components to a new model or a new version of an existing model without limiting the choice of protocols to be used underneath and without sacrificing interoperability with existing components written to other models or other versions of the same model (even when those components will reside in the same address space).

Distributed Object Systems such as CORBA and OLE, like the Remote Procedure Call models which preceded them, address the issue of protocol evolution to a degree by separating the programming model from the details of the underlying protocol which is used to implement the communication. These systems do so by introducing a declarative Interface Definition Language (IDL) and a compiler which generates code that transforms (or allow the transformation of) a protocol neutral API to the particular protocol supported by the model. As the protocol changes (or new protocols become available), the compiler can be updated to generate new protocol adapters to track the protocol evolution.

A side benefit of IDL is that it forces each component's interface to be documented and decouples a component's interface from its implementation. This allows an implementation to be updated without affecting the programming API of clients and simplifies the parallel development of multiple components.

In CORBA and OLE, interfaces are reflective—a client can ask an implementation object whether it supports a particular interface. Using this dynamic mechanism, a client can be insulated from interface (as well as implementation) changes as clients familiar with a new interface (or a new version of an interface) ask about it, while old clients restrict themselves to using the old interface.

While such systems abstract the choice of communication protocol, none addresses the situation in which a system needs to be composed of components that cannot all share a single protocol or a single version of a protocol. CORBA and OLE have each defined a protocol that all components "will eventually adopt". For reasons cited above, that solution is merely the addition of yet another (incompatible) protocol to the mix—a protocol which will evolve, and in fact is already evolving.

It would be desirable to have a communications framework that provides for the evolution of communications models and protocols and provides a mechanism for accessing legacy applications and for overcoming related problems.

SUMMARY OF THE INVENTION

The communications infrastructure of the present invention provides a mechanism that supports multiple simultaneous communication protocols. The novel mechanism of the invention allows an application program executing on one process to make method calls on objects located in other processes and yet be entirely oblivious to the communication protocol used to deliver data between the two processes. Furthermore, the mechanism allows a transport (or protocol) to be independent of the in-memory representation chosen for abstract data types transferred between distributed processes.

The present invention provides a communications framework that presents application code with an abstraction layer including a distributed apply() function. The abstraction of the apply() allows applications programs to be written without any direct reference to the communication protocol selected to implement the distributed apply(). The abstraction layer further includes mechanisms for causing self-marshaling and demarshaling of arguments provided to remote procedures. The marshaling of arguments is accomplished in a manner that does not require knowledge of the memory layout chosen by the application. The marshaling of arguments permits in-memory representations of abstract data types to be independent of the underlying communication protocol.

In the communications framework, an application program invokes a method on a target object. This method invocation is converted into an invokation of the distributed apply() method. This invocation of apply() is passed as arguments an ObjectReference referring to the target object, an identifier for the method to invoke, and a self-marshalling argument list. This apply() invokation is on a Remote Procedure Call Transport which operates to establish a communications link to a process in which the target object resides.

The marshaling and demarshaling of arguments passed to remote methods is accomplished according to the invention by defining an OutStream class. The OutStream class defines an interface for at least one primitive marshaler and for a composite data type marshaler, wherein each remote procedure call transport derives an OutStream object from the OutStream class for marshaling arguments onto the communications link. The communication framework also includes a composite data type class and at least one transport independent marshaler. The OutStream object recognizes any argument that is of a composite data type. The RPC_Transport invokes a transport independent marshaler to marshal any composite data type argument objects.

The transport independent marshalers invoke the primitive marshalers to marshal any non-composite components of a composite argument object. To marshal composite components, the transport independent marshalers invoke marshaling methods of such composite components. The marshaling of composite data types is accomplished in a recursive fashion.

The communication framework also contains an InStream class for defining an interface for primitive demarshalers and for composite data type demarshalers. The RPC_Transport derives an instream object from the InStream class for demarshaling arguments received on a communications link.

The communications framework of the invention defines ObjectReferences for target objects on which remote methods are invoked. An ObjectReference is an object that defines information necessary or useful in locating the target object. An ObjectReference for the target object is one of the elements of an invocation of the distributed apply() method.

ObjectReferences may be grouped with other ObjectReferences that are generally co-located or co-migrated. Such a grouping is referred to as a VirtualProcess. Each ObjectReference or VirtualProcess contains (or refers to other objects that contain) one or more protocol-specific profiles. These profiles are hints of how a process may connect to a target object using a given protocol. The profiles are grouped into those that have been successfully used (verified) and those that have not been used (unverified). The communications framework provides a mechanism for merging the profiles received with an ObjectReference. This merging mechanism gives priority to verified profiles.

The communications framework of the invention further defines a query_op() method. The interface definition for query_op() specifies that the query_op() method accepts a reference to a specifier for an operation to be performed, and that the query_op method returns a reference to a dispatch function to be invoked to perform the operation provided as an argument to an invocation of the query_op method. The dispatch function accepts as arguments a reference to a target object on which to perform the operation and a reference to an object containing a list of values passed to and returned from the operation, and at least one target object deriving from the base class and providing an implementation for the query_op method.

The query_op method may provide a reference to an argument list. The caller (of query_op) then provides values for that argument list by demarshaling arguments received over the communications link between the calling process and the process of the target object.

Other aspects and advantages of the present invention will become apparent from the following detailed description, taken in conjunction with the accompanying drawings, illustrating by way of example the principles of the invention.

DETAILED DESCRIPTION OF THE PREFERRED EMBODIMENTS

Figure 1:
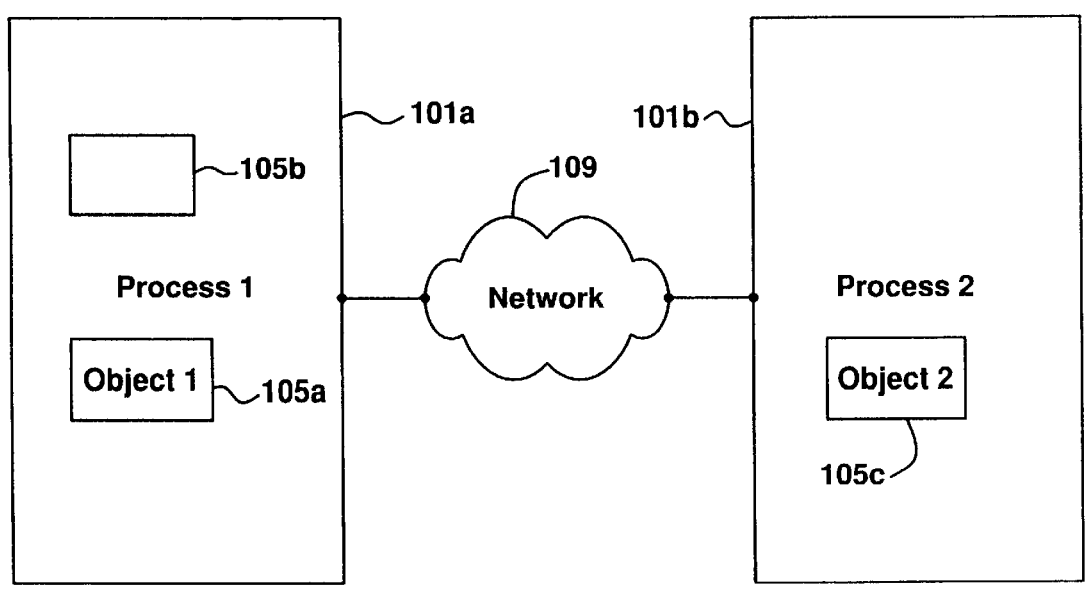
FIG. 1 is an illustration of a distributed computing environment.

As shown in the drawings for purposes of illustration, the invention is embodied in a novel communications infrastructure. In a distributed computing environment several problems, described above, arise from the proliferation of communications protocols. These problems relate to the difficulty, undesirability, and, sometimes impossibility of modifying existing applications so these applications communicate with other components using the same communication protocol.

The communications infrastructure of the present invention provides a mechanism that supports multiple simultaneous communication protocols. This novel mechanism allows an application program executing on one process to make method calls on objects located in other processes and yet be entirely oblivious to the communication protocol used to deliver data between the two processes. Furthermore, the mechanism allows a transport to be independent of the in-memory representation chosen for abstract data types transferred between distributed processes.

As shown in the exemplary drawings, the present invention provides a communications framework that presents application code with an abstraction layer including a distributed apply() function. The abstraction of the apply() allows applications programs to be written without any direct reference to the communication protocol selected to implement the distributed apply(). The abstraction layer further includes mechanisms for causing self-marshaling and demarshaling of arguments provided to remote procedures. The marshaling of arguments is accomplished in a manner that does not require knowledge of the memory layout chosen by the application. The marshaling of arguments permits in-memory representations of abstract data types to be independent of the underlying communication protocol.

Description of the Hardware of a Computer Network Implementing a Distributed Computing Environment FIG. 1 is an illustration of a distributed computing environment. FIG. 1 is an illustration of a distributed computing environment 100. FIG. 1 is illustrative in nature. Actual distributed computing environments are typically much more complex than the environment shown in FIG. 1.

A first process 101a contains two objects 105a and 105b. The process 101a may be a running computer program executing on a computer system. Object 105a may be resident in a running computer program. The process 101a is connected to a computer network 109.

A second process 101*b* is also connected to the computer network 109. The second process contains a second object 105*c*.

In an object oriented distributed computing environment, e.g., the one shown in FIG. 1, a program executing in one process may invoke the methods of objects in other processes. Thus, if the object 105*c* is a count object, a program in the first process 101*a* may seek to increment the count held by object 105*c* by invoking the Increment method of the object 105*c*. Such an invocation is referred to as a remote method invocation.

To effect a remote method invocation data must be communicated via the network from the first process 101*a* to the second process 101*b*, and also in the opposite direction. This communication is carried out according to one of several known communications protocols. Examples of communications protocols include RPC mechanisms over TCP/IP (such as DCE or ONC) and distributed object protocols (such as CORBA IIOP, DCOM, and Java/RMI).

Figure 2:
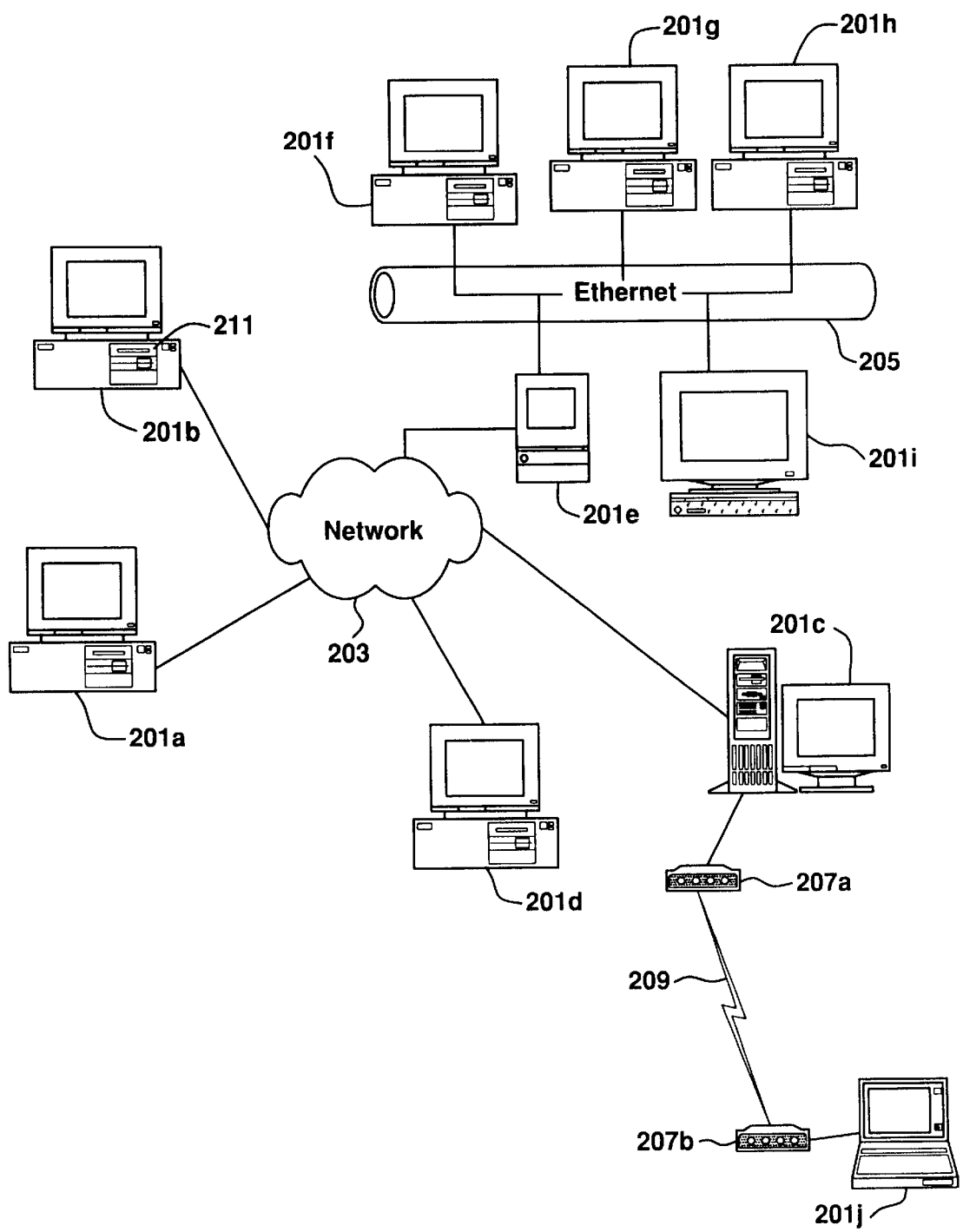
FIG. 2 is an illustration of an exemplary hardware configuration of a distributed computing environment.

FIG. 2 is an illustration of an exemplary hardware configuration of a distributed computing environment. A number of computers 201 (*a–j*) are connected to one another via a network 203 and intermediate computers. Some of these computers (201*e–i*) are connected to a local area network 205. This local area network 205 is further connected, via an intermediary router or computer 201*e* to a wider area network 203. The wider area network 203 could, for example, be a corporate intranet or the Internet. Other computers, e.g., computer 201*j* may be connected to the other computers in the network via a telecommunications link 209. This communications link 209 is established by modems 207*a* and 207*b* which are connected to computers 201*c* and 201*j*, respectively. An infinite number of other possible combinations of computers and connections are possible, and the illustration in FIG. 2 should only be taken as an example.

To further elaborate on the example of FIG. 1, the first process 101*a* may be executing on any one of the computers 201(*a–i*I) in FIG. 2. Similarly, the second process 101*b* may be executing on one of the other computers 201(*a–i*) in FIG. 2.

Most, if not all, of the computers 201 contain or are attached to some form of data storage media, e.g., a disk drive 211.

Communication Framework of the Present Invention

The present invention provides a communications framework for enabling processes in a distributed computing environment to use any of a number of communications protocols for remote method invocation on objects in other processes. The communications protocol actually used by the communications framework to effect a remote method invocation is transparent to the programs issuing the remote method invocation. Furthermore, the selection of a protocol is dynamic—i.e., which protocol is being used may change from one invocation of a remote method to the next.

Figure 3:
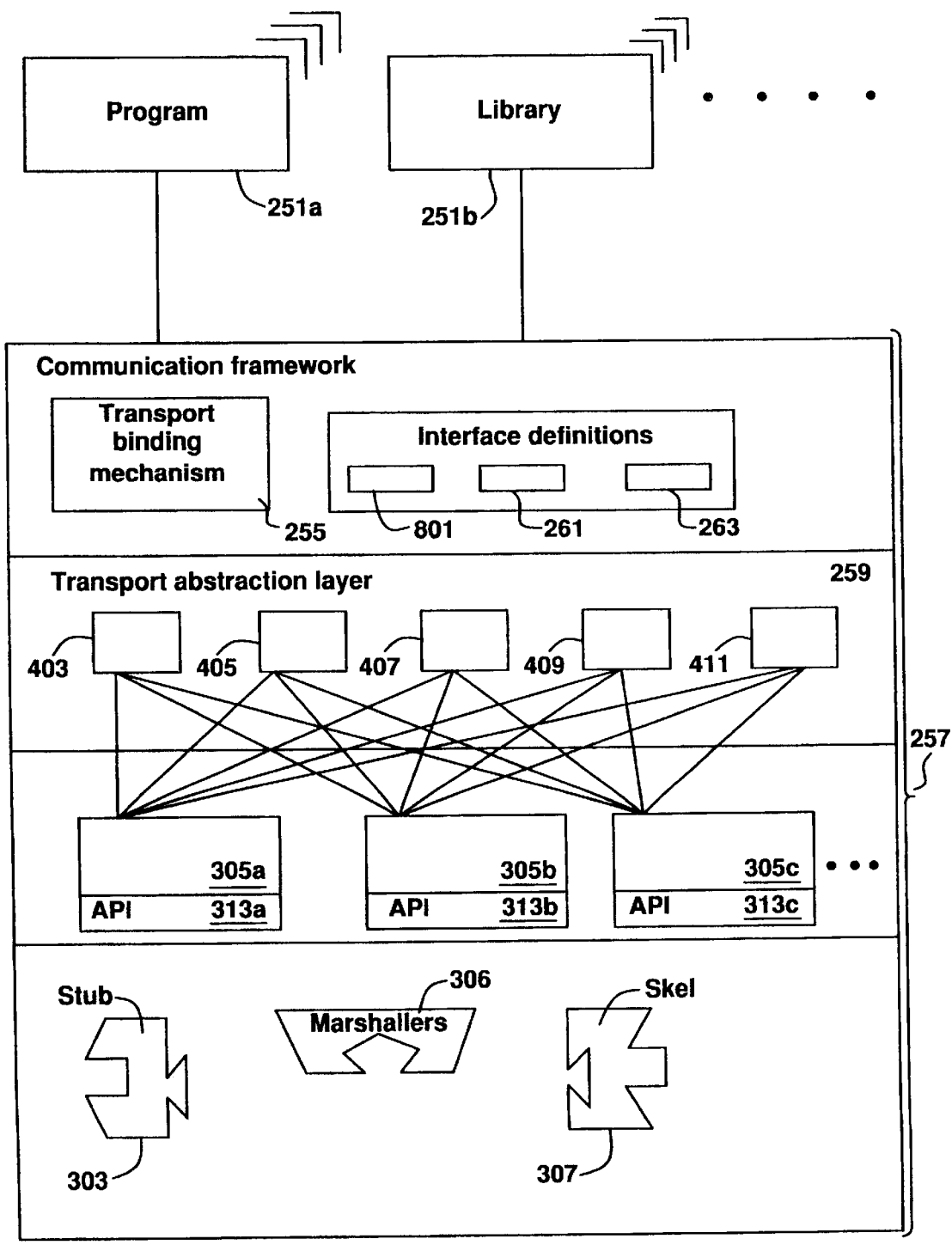
FIG. 3 is a block diagram showing pieces of the communication framework of the present invention.

FIG. 3 is a block diagram showing the relationship of the communication framework of the present invention to other pieces involved in processing a remote method invocation. FIG. 3 is an illustration of the pieces that coexist in one process. These pieces cooperate to effect a remote method invocation on an object. That object may be located in the same process as the invoking program, or that object may be located on a remote process.

Any number of user application programs 251*a* and libraries 251*b* make distributed calls via some specified application program interfaces (API's). The user applications 251 ultimately communicate with other components (not shown) located on a remote process (in some cases both the "remote" object may be located in the local process). The transportation of data between the applications 251 and these remote objects is accomplished via one of several communication protocols. Example communication protocols include ONC RPC, DCE RPC, CORBA IIOP, SMTP, SNMP, HTTP, and Java/RMI. Corresponding to each protocol is a Remote Procedure Call Transport 305 (hereinafter, "RPC_Transport").

Each protocol typically has its own unique API 313 (e.g., 313*a–c*). The communications framework 257 of the present invention hides that protocol-specific API 313 from the application programs 251*a* and libraries 251*b*—i.e., application programs 251*a* may be programmed using a protocol independent interface. The communication framework 257 defines certain interfaces. Examples of such interface defining classes are the ArgList class 261 and the Arg class 263, and the TxType class 801. These classes are described in greater detail below.

The communication framework 257 also contains a transport abstraction layer 259. The transport abstraction layer 259 provides a number of classes from which an RPC_Transport 305 derives. These classes provide the interfaces for accomplishing the distributed apply() function as well as the self-marshaling and de-marshaling of arguments. The classes, including classes 403 through 411, are described in greater detail in conjunction with FIG. 6.

The communication framework 257 contains a registration mechanism 255 for registering an RPC_Transport 305 to the communication framework 257. Each RPC_Transport 305 is registered with the communication framework 257 using the registration mechanism 255. Binding an RPC_Transport 305 to the communication framework 257 may occur either when the RPC_Transport 305 is compiled, when the RPC_Transport 305 is linked, or by creating the binding dynamically when the application 251 is executed (for example, by using dynamic link libraries).

The communication framework 257 further contains objects used in the processing of a remote method invocation. These objects include a Stub object 303, transport independent marshalers 306, and a Skel object 307. These objects are described in greater detail below.

Components of a Remote Method Invocation According to the Present Invention

Figure 4A:
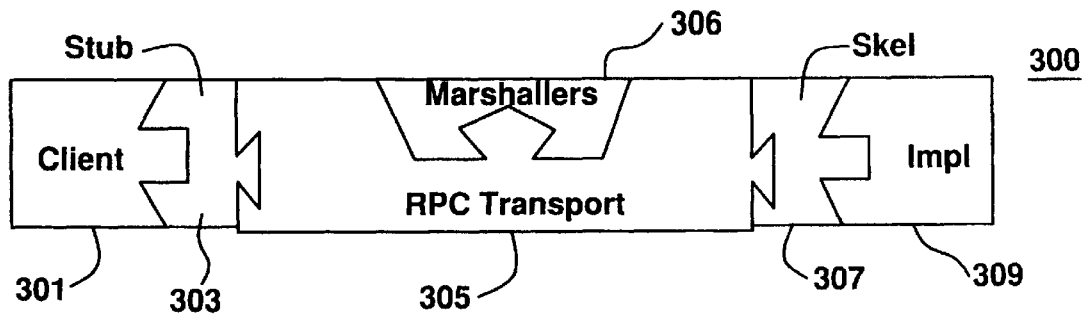
FIG. 4(a) is a block diagram illustrating the various components of a remote procedure call (RPC) according to the present invention.
Figure 4B:
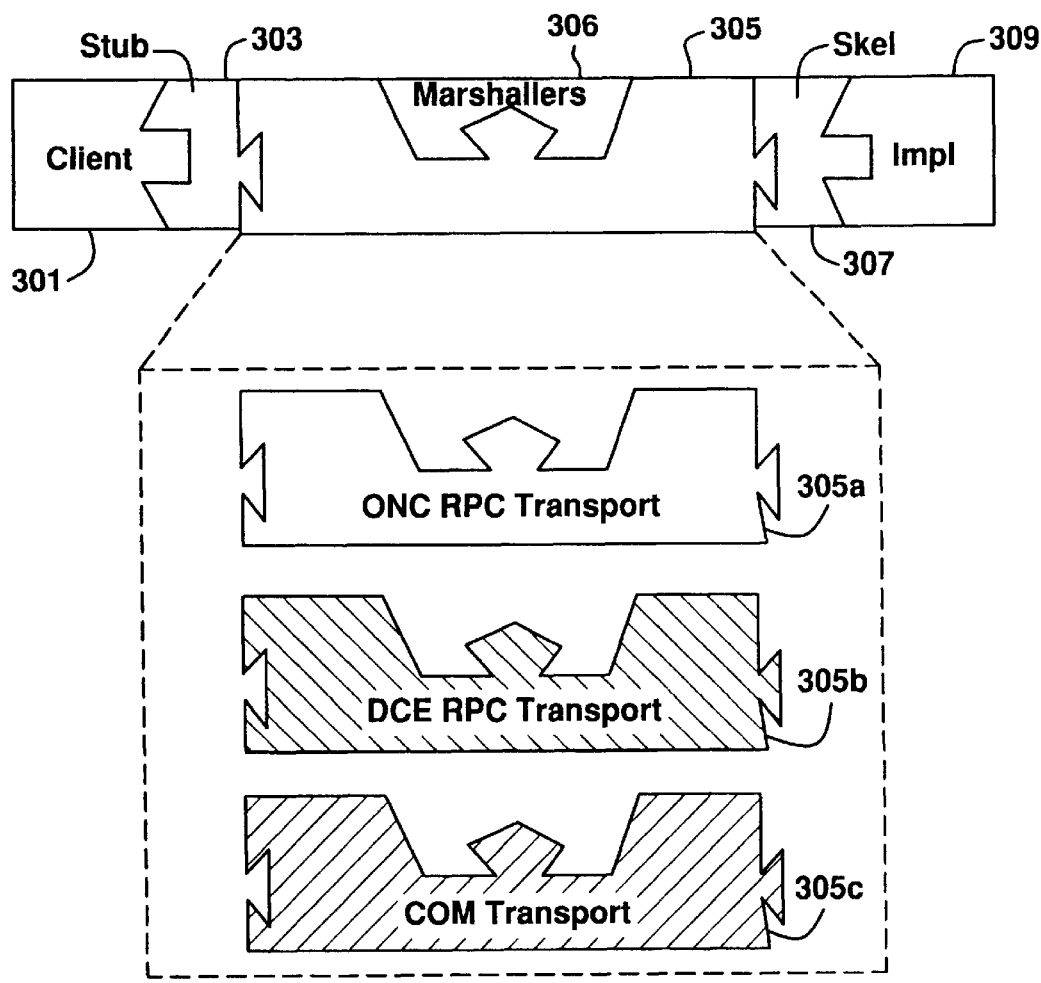
FIG. 4(b) is a block diagram showing multiple RPC_Transports coexisiting to establish communications between a client and an implementation.

FIG. 4(*a*) is a block diagram illustrating the various components of a remote method invocation as processed by the communication framework 257 of the present invention. A client 301, e.g., a user application program 251, issues a call to a method of an implementation object 309. The implementation 309 may be, for example, a C++ object. In a non-distributed system, the client 301 directly communicates with the implementation 309 using mechanisms such as a stack or general-purpose registers.

In creating a remote procedure call, the client 301, using a defined applications program interface, has direct communication with a Stub 303. The client 301 and the Stub 303 both execute in the first process 101*a*. The client 301 makes the call of the form:

result=object.foobar (a,b,c)

to the Stub 303, where "object" is an identifier specifying a target object, "foobar" is a method of the target object, and "a,b,c" are arguments of "foobar". The Stub 303 converts this method invocation, from the client 301, into a call of the form:

transport->apply (object_reference, "foobar", ArgList [, CallInfo])

and issues this command to the RPC_Transport 305, where "object reference" is an identifier specifying an ObjectReference associated with the target object (an example ObjectReference is illustrated in FIG. 10(*a*)). In one embodiment, the Stub 303 creates a Request object instance. The Stub 303 then invokes a method of the Request object. This method of the Request object carries out the conversion.

Essentially, the Stub 303 (directly or via a Request object) tells the RPC_Transport 305 to "invoke the method 'foobar' on the implementation associated with ObjectReference using the list of arguments in ArgList."

In one embodiment, the apply() includes a fourth argument—CallInfo. CallInfo is a reference to an object with Quality of Service information. The embodiment which incorporates CallInfo and Quality of Service, is discussed in greater detail below.

In an alternative embodiment, the parameters object_reference, "foobar", ArgList, and CallInfo (if used) are wrapped into one object (e.g., an instance of OutgoingCall) that references those elements. In that embodiment, the apply() call takes the form:

transport->apply(OutgoingCall).

The RPC_Transport 305 operates to execute the distributed apply() call issued from the Stub 303.

The remote method invocation further involves a number of transport independent marshalers 306. The transport independent marshalers 306 reduce a composite data type object into primitive data types that collectively form that composite data type. This decomposition process is performed recursively on any composite data type substructures until all such substructures have been decomposed into primitive data types. Each such primitive data type is marshaled or demarshaled by the RPC_Transport 305. The transport independent marshalers 306 are discussed in greater detail below.

The combination of the ObjectReference, the method identifier, and the ArgList forms a call-frame. The RPC_Transport 305 cooperates with the transport independent marshalers 306 (using the primitive marshalers of the RPC_Transport 305) to migrate each call-frame from one process space to another, e.g., from process 101*a* to process 101*b* via computer network 109.

The recipient of the call-frame migrated by the RPC_Transport 305 is a skeleton (sometimes referred to merely by "Skel") 307. The server end of the RPC_Transport 305 issues the distributed apply() on the Skel 307 in the form:

Skel.apply (impl, "foobar", ArgList);

where "impl" is the implementation object 309 with which the client 301 is interacting.

The Skel 307 converts the apply() from that form into:

result=impl.foobar (a,b,c).

Thus, the Skel 307 is a dispatcher of the generic call-frame that the Stub 303 constructed.

In an alternative embodiment, the recipient of the call-frame calls a function called query_op() on the target object. The recipient receives from query_op several pieces of information and a reference to a data structure on which to demarshal the arguments of the call-frame. query_op() is discussed in greater detail below.

Local Bypass Optimization

When the Stub 303 and Skel 307 exist in the same process space, e.g., process space 101*a*, there is no need to convert the method invocation on the impl 309 into a distributed apply(). Therefore, in such cases, the Stub 303 implements the call result=object.foobar (a,b,c); by calling
result=impl.foobar (a,b,c);

thereby bypassing the RPC_Transports 305.

This optimization may be disabled if it is required that all messages between objects pass through an RPC_Transport 305 (even an intra-process RPC_Transport 305). This requirement often arises when supporting replicated messaging, transactions, or strong security models.

Alternate Transports

All RPC_Transports 305 interact with Stubs 303, skels 307, and transport independent marshalers 306 using common interfaces. FIG. 4(*b*) is a block diagram illustrating that several RPC_Transports 305, e.g., an ONC RPC_Transport 305*a*, a DCE RPC_Transport 305*b*, and a COM RPC_Transport 305*c* (where ONC, DCE, and COM are known communication protocols), can coexist. Each RPC_Transport 305 need only support a fixed number of primitive data type marshalers (these are discussed in greater detail below). Each of the transport independent marshalers 306 can be used by any of the RPC_Transports 305.

Data Flow for a Remote Method Invocation According to the Present Invention

Figure 5:
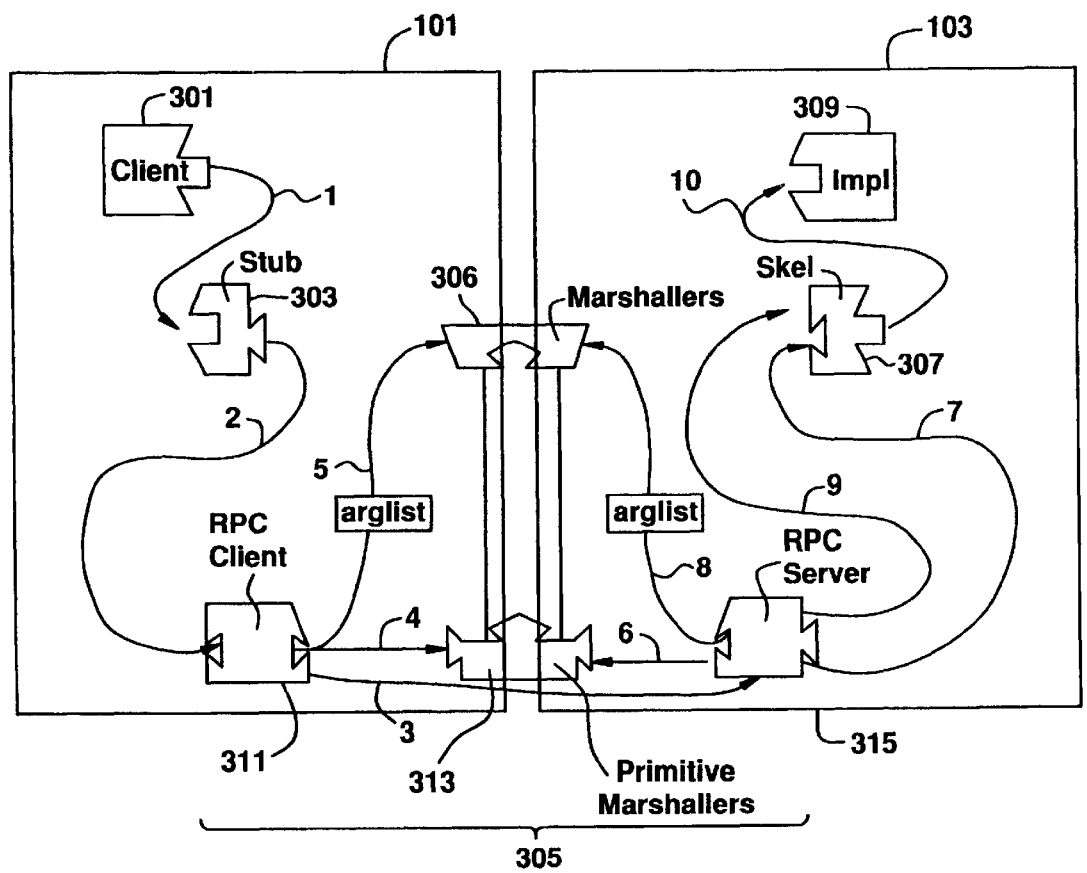
FIG. 5 is a flow diagram illustrating the data flow involved in a remote procedure call according to the invention.

FIG. 5 is a flow diagram illustrating the data flow of a remote method invocation, according to the invention. As discussed above, the remote method invocation involves two processes 101*a* and 101*b*. A client 301—existing in the first process 101*a*—seeks to invoke a method of an implementation object 309—existing in the second process 101*b*.

In step 1, the client 301 initiates the remote procedure call by issuing the method "result=object.foobar (a,b,c)" on the Stub object 303. In this call, "object" is a reference to the remote object—the target object, "foobar" is the method of that object to be invoked, and "a,b,c" is a list of arguments to be applied to that method.

In step 2, the Stub object 303 converts this call to a distributed apply() call as described above. The Stub object 303 creates an argument list object, the ArgList object, and calls the apply() function of the RPC_Transport 305. An intervening step of using a Quality of Service (QoS) parameter to select which RPC_Transport 305 to use is discussed below.

In the example of FIG. 5 the RPC_Transport 305 is divided into three components, the RPC_Client 311, the primitive marshalers 313, and the RPC_Server 315. The communications framework 257 (in particular the transport abstraction layer 259) defines interfaces between the RPC_Transports 305, on the one hand, and the Stub 303, the transport independent marshalers 306, and the Skel 307, on the other. However, the communications framework 257 does not impose any particular implementation of the RPC_Transports 305. Thus, the division of the RPC_Transport 305 into constituent parts 311, 313, and 315, is merely one possible embodiment. In this illustrative embodiment, in step 2, the Stub object 303 calls the apply() function of the RPC_Client 311.

In step 3, the RPC_Client 311 establishes a protocol-specific binding to the RPC_Server 315 (of an RPC_Transport 305 residing in a second process), i.e., the protocol establishes a communication channel to the second process, e.g., opens a socket, acquires a shared memory segment, or initializes an RS-232 port.

In step 4, the identifier for the target object, the method to be invoked on the target object, and any other operation selection information (e.g., the CallInfo object) are marshaled onto the communication channel. Alternatively, the type signature of the operation may be marshalled to allow selection and dispatching based on operation signature.

In step 5, the RPC_Client 311 tells the ArgList to marshal its IN and INOUT arguments.

These marshaling steps are executed by the transport independent marshalers 306. The transport independent marshalers 306 reduce any composite data types into primitives and calls upon the primitive marshalers 313 of the RPC_Transport 305 to marshal these primitives to the remote process.

Each RPC_Transport 305 may preempt the default marshaling/demarshaling methods of the transport independent marshalers 306. Such preemption may be required by RPC_Transports 305 for certain communication protocols (e.g., DCE RPC) for adjusting alignment, changing the order of arguments, providing inter-field padding for composite data type objects, or performing other protocol-mandated data transformations.

In step 6, the RPC_Server 315, by calling upon the primitive marshalers 313, demarshals the identifier for the target skeleton and the name of the operation to be performed and any other operation selection information (e.g., operation signature (if supplied) or the CallInfo parameter). The RPC_Server 315 further determines the address of the Skel 307 associated with the implementation 309 and forwards the apply() call to the target Skel 307.

In step 7, the transport's derived RPC_Server 315 upcalls the Skel 307 to obtain the server-side argument list, as an ArgList object, for the specified operation. The upcall also supports the CallInfo parameter such that QoS parameters such as thread dispatch policy or credentials can be checked and specified. Upon receiving the upcall, the Skel 307 allocates memory for the incoming arguments.

The ArgList object that is returned from the Skel 307 is operation specific. In step 8, the RPC_Transport 305 requests the ArgList to demarshal its arguments (i.e., the IN and INOUT arguments of the apply() call). Each argument in the ArgList calls upon the transport independent demarshalers to construct the argument's contents from primitives demarshaled using the transport's primitive demarshalers.

In step 9, the Skel 307 is upcalled to apply the demarshaled ArgList to the target operation.

In step 10, the Skel 307 converts the call from the ArgList format into a call on the actual method of the implementation 309 (also known simply as "impl"). I.e., the Skel 307 converts the call from the format Skel.apply (impl, "foobar", ArgList)

to result=impl.foobar (a,b,c).

To return an out parameter, when the call on the Skel 307 completes, the RPC_Server 315 asks the ArgList to marshal its INOUT and OUT parameters back to the client process (again using the transport independent marshalers 306 and primitive marshalers 313). The RPC_Client 311 then demarshals the out parameters and the Stub 303 returns the out values to the client 301.

Classes of the Transports Abstraction Layer

The communication framework 257 defines the interfaces for the RPC_Transports 305. The interface definition is specified by five classes, namely, the Info class 403, the RPC_Client class 405, the RPC_Server class 407, the InStream class 409, and the OutStream class 411.

A first class provided through the transport abstraction layer 259 is the Info class 403, which is described in greater detail below.

The interface for the distributed apply() function is defined in one such class of the transport abstraction layer 259, namely the RPC_Client class 405, which is defined as follows:

```
class RPC_Client {
    public:
    virtual bool apply (const ObjectRef &obj,
        const Identifier &oper,
        ArgList &args, Callinfo &info)
}
```

Figure 6:
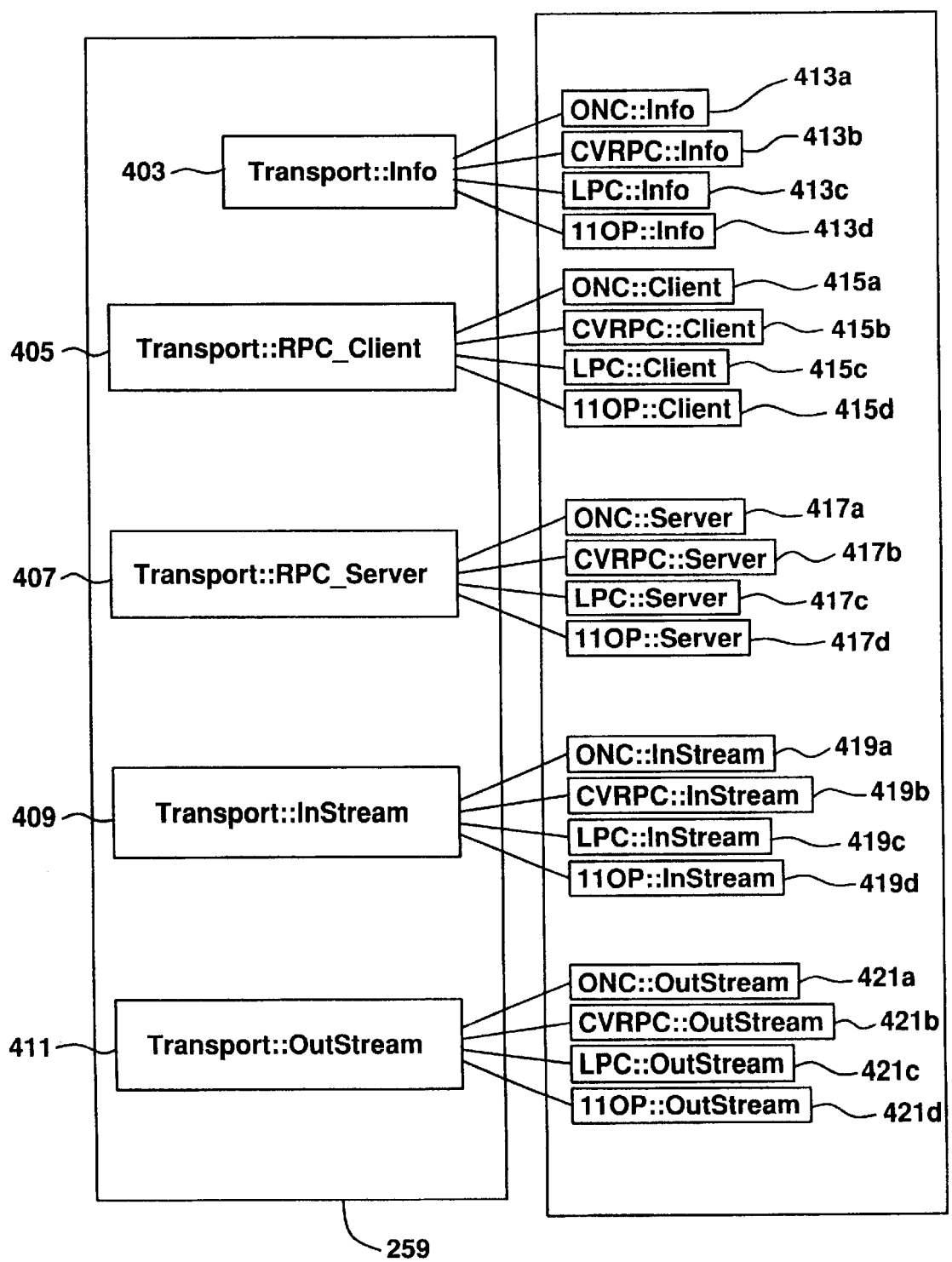
FIG. 6 is a block diagram illustrating the various classes of the transport abstraction layer and exemplary concrete classes of three RPC_Transports.

Each RPC_Transport 305, corresponding to a particular communications protocol, derives a concrete class from the RPC_Client class 405, e.g., in the example of FIG. 6, the ONC::Client 415 a is a concrete instance of the RPC_Client class 405 for the RPC_Transport 305 for the ONC protocol. That concrete class provides a protocol-specific implementation of the apply() function, i.e., for the ONC protocol.

An RPC_Transport 305 marshals the various values, including the arguments for the remote method, onto the communication infrastructure. The transport abstraction layer 259 contains an OutStream base class 411. The OutStream base class 411 defines interfaces for methods used to Marshal various primitive data types. The OutStream base class 411 is defined by the following C++ code:

```
class OutStream {
    public:
    virtual bool marshal (bool val)=0;
    virtual bool marshal (short val)=0;
    virtual bool marshal (long val)=0;
    virtual bool marshal (unsigned short val)=0;
    virtual bool marshal (unsigned long val)=0;
    virtual bool marshal (char val)=0;
    virtual bool marshal (unsigned char val)=0;
    virtual bool marshal (float val)=0;
    virtual bool marshal (double val)=0;
    virtual bool marshal_string (const char *val, unsigned
        long length)=0;
    virtual bool marshal_octets (const unsigned char *val,
        unsigned long length)=0;
    virtual bool marshal (const TxType &val)=0;
};
```

An RPC_Transport 305 demarshals various incoming values. The interfaces for the methods that carry out the demarshaling is defined in the transport abstraction layer 259 in the InStream class 409. The InStream class 409 is defined by the following C++ code:

```
class InStream {
    public:
    virtual bool demarshal (bool& val)=0;
    virtual bool demarshal (short& val)=0;
    virtual bool demarshal (long& val)=0;
    virtual bool demarshal (unsigned short& val)=0;
    virtual bool demarshal (unsigned long& val)=0;
    virtual bool demarshal (char& val)=0;
    virtual bool demarshal (unsigned char& val)=0;
    virtual bool demarshal (float& val)=0;
    virtual bool demarshal (double& val)=0;
    virtual bool demarshal_string (char *val, unsigned
        long length)=0;
    virtual bool demarshal_octets (unsigned char *val,
        unsigned long length)=0;
    virtual bool demarshal (TxType &val)=0;
};
```

The InStream and OutStream classes may include marshaling and demarshaling methods for other primitive data types. Examples of such additional primitive data types include the wide character and wide string data types.

Marshaling

Each argument transferred via the RPC_Transport 305 is self-marshaling and self-demarshaling. As discussed above in conjunction with FIG. 5, the Stub object 303 converts a call to a method on a remote procedure from the form:

result=object.foobar (a,b,c)

to:

transport->apply(object_reference, "foobar", ArgList
    [,CallInfo]);

The ArgList parameter presented in the "transport->apply (object_reference, "foobar", ArgList [,CallInfo])" is an object which refers to objects for each of the arguments. These created objects encode the direction of the argument (i.e., IN, OUT, INOUT). For example, in the apply() call above, an object is created for each of the a, b, and c arguments and the ArgList parameter is an object with pointers to each of those objects. The ArgList object derives from the ArgList class 261 of the communications framework 257.

Figure 7:
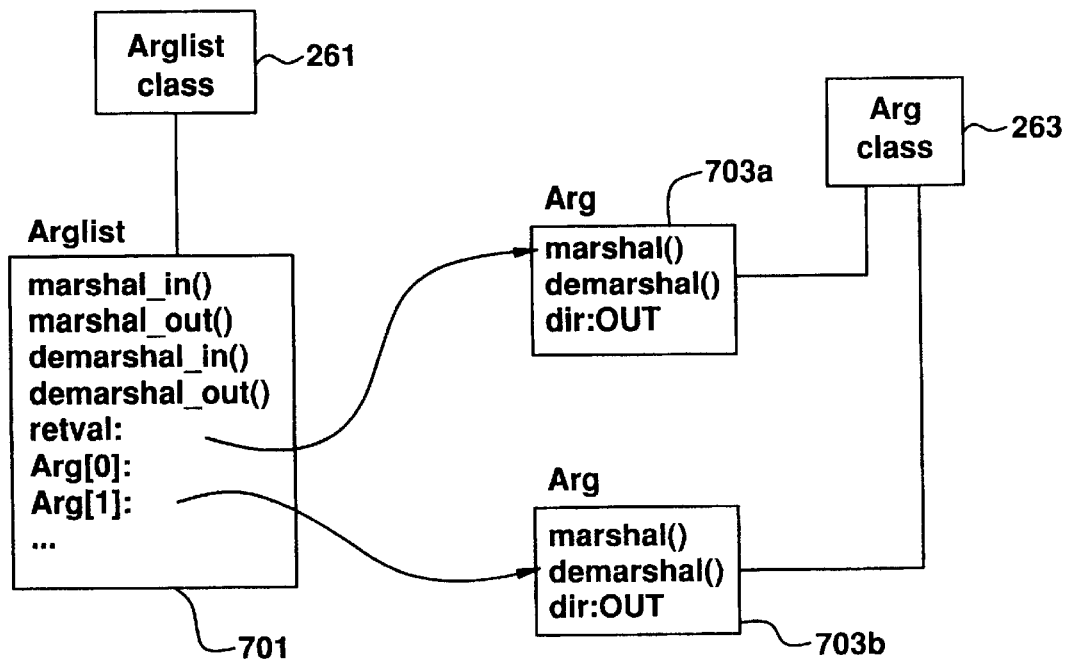
FIG. 7 is an block diagram of the ArgList argument to the RPC_Transport's apply() method.

FIG. 7 is an block diagram of the ArgList argument to the transport's apply() method. The ArgList 701 is an object that derives from the ArgList class 261 and contains implementations for the methods marshal_in (), marshal_out(), demarshal_in() and demarshal_out(). The RPC_Transport 305 invokes the marshal_in() method to marshal input arguments (Arg's of type IN and type INOUT) onto the communication channel; the RPC_Transport 305 invokes the marshal_out() method to marshal output arguments (Arg's of type OUT and INOUT) onto the communication channel; the RPC_Transport 305 invokes the demarshal_in() to demarshal an input argument received on the communication channel; and the RPC_Transport 305 invokes the demarshal_out() method to demarshal an output argument from the communications channel.

The Stub object 303 creates a derived instance (e.g., 703a and 703b) of the Arg class 263 for each argument (e.g., a, b, and c) to be presented to the remote method. The ArgList object 701 is an object with pointers to each such Arg instance 703 for each argument, e.g., 703a and 703b.

The following C++ code is a partial definition of the Arg class 263:

```
class Arg {
public:
    enum Mode {IN_ARG, OUT_ARG, INOUT_ARG};
    AnyRef value ( ) const=0;
    Mode direction ( ) const=0;
    Identifier name ( ) const=0;
    virtual bool marshal (OutStream& str) const;
    virtual bool demarshal (InStream &str);
    . . .
}
```

Each of the Arg objects 703 contains a direction field ("dir") indicating the direction that the argument flows with respect to the remote function, i.e., IN, OUT, or INOUT. The RPC_Transport 305 transforms, by invoking the marshal_in() method of the ArgList object, the apply() request into an outbound message suitable to the communications protocol used to communicate with the remote process.

Returning to FIG. 6, the Transport Abstraction Layer 259 provides two classes, InStream 409 and OutStream 411, for marshaling and demarshaling arguments. The Transport Abstraction Layer 259 also uses a class TxType 801 for marshaling composite data type classes and certain structured base classes, e.g., StructBase, UnionBase, and ArrayBase.

If a reply is expected from the remote method (e.g., the return type for the remote method is non-void, a particular argument is an OUT or INOUT, or the client has specified that it wants to check for exceptions), the RPC_Transport 305 waits for a response message. In one embodiment, client side timeouts and server side deadlines are used to manage the duration of the time that the RPC_Transport 305 might wait.

When a response message is received, the RPC_Transport 305, converts the OUT and INOUT parameters referenced by the client's ArgList object into the memory format desired by the client 301 by invoking the demarshal_out() method of the ArgList object. In an alternate embodiment, the RPC_Transport 305 may directly request each argument to demarshal itself in some sequence (so doing is occasionally necessary if the RPC_Transport 305 marshals Arguments in a non-standard order (such as largest first)).

Each Arg object 703 defines a marshal() and a demarshal() method. Returning to FIG. 6, each RPC_Transport 305 contains primitive marshalers derived from the transport abstraction layer 259 base classes InStream 409 and OutStream 411. These derived classes are shown in FIG. 6 as elements 419 (for derived InStream classes) and elements 421 (for derived OutStream classes). For example, the ONC transport contains the ONC::InStream object 419a which derives from the InStream base class 409 and the ONC::OutStream object 421a which derives from the OutStream base class 411. The RPC_Transport 305 creates a concrete instance of the OutStream class 411. The marshal() method serializes the value of the argument onto that concrete instance of the transport OutStream class. For demarshaling, the RPC_Transport 305 creates a concrete instance of the InStream class 409. The demarshal() method serializes the value of the argument onto that concrete instance of the transport InStream class.

Serialization and deserialization of object values have been described by Seliger, Booch and Strustroup (Seliger, Rob. "Extending C++ to Support Remote Procedure Call, Concurrency, Exception Handling, and Garbage Collection", Usenix C++ Conference Proceedings, April, 1990; Booch, Grady. "C++ Booch Components: Class Catalog Version 2.3", Rational Software, 1993: Strustroup, B. "An Extensible IO Facility for C++", Proceedings Summer 1985 Usenix Conference, June 1985. The teachings of which are incorporated herein by reference).

Marshaling of Composite Data Type Objects

For composite data types (e.g., unions, arrays, structures) the transport abstraction 259 layer includes a common base class, TxType 801, which the OutStream and InStream classes use to implement their marshal() and demarshal() methods. The following C++ code provides a partial definition of the TxType class 801:

```
class TxType {
public:
    virtual bool marshal (OutStream& str) const=0;
    virtual bool demarshal (InStream &str)=0;
    . . .
}
```

The Arg class 263 implements its marshal() and demarshal() methods by calling the marshal() and demarshal() methods on the OutStream and InStream classes rather than by directly calling the marshal() and demarshal() methods on its contained value. In the normal case, the OutStream marshal (TxType& val) method is implemented by simply invoking the marshal() method on its TxType argument. The indirection enables an RPC_Transport 305 to override the marshal(const TxType& val) member function if the RPC_Transport 305 needs to adjust the default marshaling format for aggregate data types. An RPC_Transport 305 uses this capability to match a pre-existing wire format. For example, the some message formats (e.g., NDR) require special padding characters, particular member ordering for structures and unions, or have special alignment requirements when marshaling aggregate data types. Thus, RPC_Transports 305 requiring such message formats override the marshal (const TxType &) method and bypass or augment the marshal() method of the composite argument.

Marshaling is a recursive operation that terminates when the type being marshaled is a primitive type. Composite types are marshaled by asking the RPC_Transport 305 to marshal the Composite type as a TxType. Most RPC_Transports 305 merely request that the composite type marshal itself, which it does as an ordered marshaling of the components in the composite type. If these components are themselves composites, they too are sent to the marshaler as a TxType (which in turn will ask the TxType to marshal itself in terms of its components). This interaction terminates when the components are primitive data types.

Figure 8:
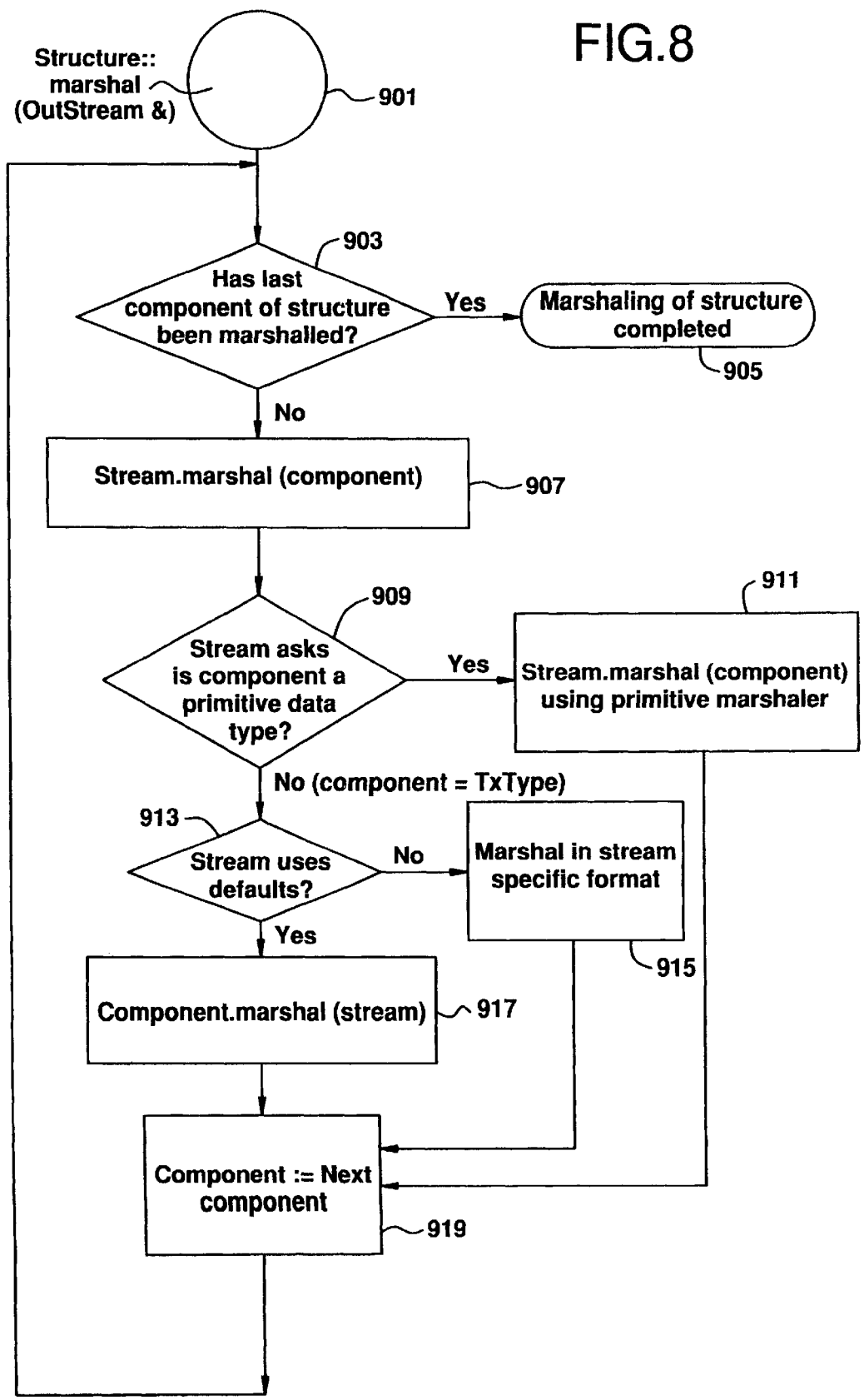
FIG. 8 is a flow chart for the method used to marshal composite data types.

The marshaling of composite data types is shown in FIG. 8. The marshaling method shown in FIG. 8 is invoked to marshal a structure, 901. If the object to be marshaled is a primitive data type, the RPC_Transport 305 uses its corresponding primitive marshaler to marshal the object rather than the procedure of FIG. 8. If all the components of the structure have been marshaled, 903, the marshaling procedure terminates, 905.

For each component, the marshal() method calls the marshal() method of the OutStream instance it received as a parameter, step 907 (note: this is a recursive call made for each component of a structure provided as an argument in step 901). If the component is a primitive data type, 909, the component is marshaled by the corresponding primitive marshaler, 911, by invoking the marshal() method of the OutStream. Otherwise the component is a TxType.

To marshal a composite data type argument, the OutStream determines if the RPC_Transport 305 uses default marshaling formatting, step 913. If a particular format is required by the RPC_Transport 305, the component is marshaled in that format, step 915. Otherwise, the RPC_Transport 305 marshals the component using defaults, by calling the marshal() method of the component and passing the OutStream as an argument to that method, step 917.

After a component of the structure has been marshaled, the next component is selected for marshaling, step 919.

This process repeats for the next component, 913, until all components have been marshaled, 903.

Figure 9:
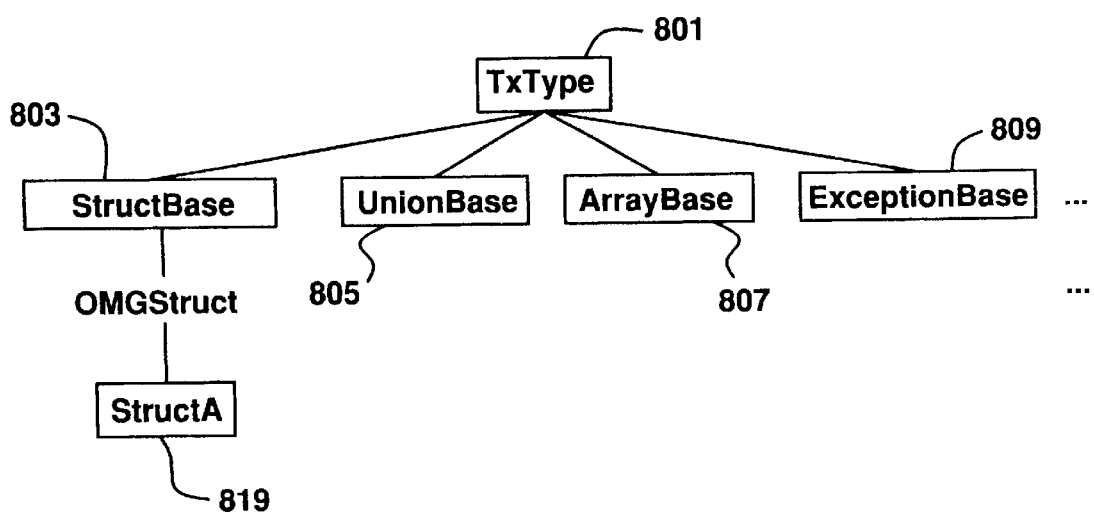
FIG. 9 is a block diagram showing the TxType class, the class for marshaling composite data types, and base classes that derive from it.

FIG. 9 is a block diagram showing the TxType class 801 and base classes that derive from it. The base classes include StructBase 803, UnionBase 805, ArrayBase 807, and ExceptionBase 809. Alternative implementations may include additional or fewer base classes. Each of the base classes provide accessors so that each RPC_Transport 305 can marshal the contents of the aggregate type.

The following C++ code is an example of a marshal() routine for an Arg object called structure A (in this example, the structure A consists of long and another structure B):

```
struct A: public StructBase {
  B my_b;
  long my_long;
  virtual bool marshal (OutStream & os)
  const {
    return os.marshal(my_b) && os.marshal (my_long);
  }
  ...
}
```

The following C++ code is an example of a marshal() routine for the structure B (in this example, the structure B consists of a short called be_short and a char called be_char):

```
struct B: public StructBase {
  short be_short;
  char be_char;
  virtual bool marshal (OutStream & Os)
  const
  {
    return os.marshal (be_char) && os.marshal (be_short)
  }
  ...
}
```

The marshal() routine of the StructA object first invokes the OutStream marshaler to marshal Struct B. Because Struct B is not of a primitive data type, but rather of type TxType (the base class of StructBase), the marshal (const TxType &) method of the OutStream instance of the RPC_Transport 305 will be selected The RPC_Transport 305 calls upon the transport independent marshaler 306 for the Struct B. The marshal() routine of the Struct B calls the primitive marshalers to marshal its components (be_char and be_short).

Struct A is also shown in FIG. 9 and derives from both TxType 801 and StructBase 803. Being a structure, Struct B also derives from TxType. The marshaling routine for the Struct A is independent of any communication protocol. Thus, it can be reused across communication protocols, and similarly, the communication protocol used to transmit Struct A to a remote process can be replaced at any time.

The marshaling and demarshaling mechanism of the present invention places no restriction on the in-memory representation of an object. The only requirement is that each marshalable object supports a marshal() and demarshal() method (either directly or in the preferred embodiment via a base class). In the above example, the object provides its own marshaler.

When it is impossible or undesirable for the actual data object to inherit from TxType, the ArgList may refer to a helper object which does so inherit and which refers to and knows how to marshal and demarshal the actual data object.

Demarshaling

Demarshaling is an analogous process to marshaling. Each object associated with a transmittable value supports a demarshal() routine. The demarshal() routine derives from the InStream class 409.

Self-demarshaling of argument objects, according to the method of the present invention, frees the RPC_Transport 305 from the burden of allocating memory for these objects. Furthermore, because composite data structure argument objects contain their own demarshaling functions, deriving from the TxType class 801, the RPC_Transport 305 (and the underlying communication protocol) does not need to determine the correct memory layout for composite types. The RPC_Transport 305 only needs to support the decoding of primitive values and removal of any extraneous padding characters and record markers that were introduced by the wire representation for composite data types.

ObjectReferences

Figure 10A:
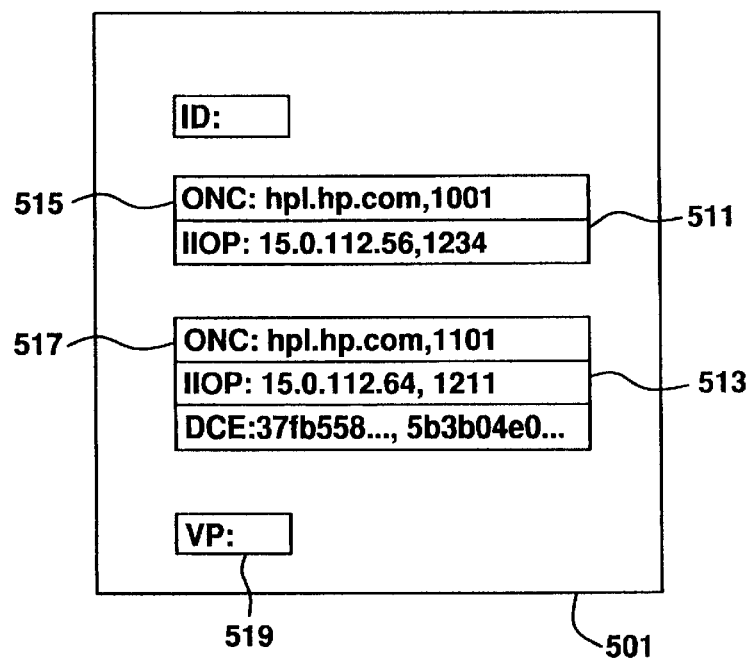
FIG. 10 is a block diagram illustrating an ObjectReference.

The apply() method of the concrete instance of the RPC_Client class 405 operates on the ObjectReference that is passed to the apply() method. FIG. 10(a) is a block diagram illustrating an ObjectReference 501. Each ObjectReference 501 contains (or refers to other objects that contain) the following pieces of information:

a virtual process identifier an object identifier (which is unique relative to a virtual process)

an identifier which refers to the location domain of the virtual process an optional time stamp indicating how recent the cache information is one or more protocol-specific profiles which collectively are a sequence of tagged value pairs which map protocol identifiers to protocol-specific binding profiles.

A profile is a protocol-specific description for identifying and connecting to an object. That description is used for establishing a communication connection to an object.

In the example of FIG. 10, the ObjectReference 501 contains a verified_locations table 511 and an unverified_locations table 513. The tables 511 and 513 contain the protocol-specific profiles.

The entries in tables 511 and 513 of an ObjectReference 501, i.e., the profiles, are hints on how an RPC_Transport 305 should connect with the object corresponding to the ObjectReference 501. Each entry in the tables 511 and 513 is indexed by a protocol identifier—the tag. For example, entries 515 and 517 both correspond to the ONC protocol. The indexed information for each entry is information used by the protocol to reach a given object. The format of the indexed information is protocol-specific and is treated as opaque by the rest of the system. Examples of connection information include location addresses, timing, host identifier, port number, routing, e-mail addresses, radio frequency, i.e., any information either useful or required by a protocol to connect to a remote object.

The verified locations table 511 in a process is made to contain entries for connection information that has been successfully used by the process to connect to the remote object corresponding to the ObjectReference 501 in which the table resides. The unverified locations table 513 contains entries for access hints that have not yet been used by the process to connect to the target.

In an alternative embodiment, rather than maintaining separate tables 511 and 513, a single table is maintained within each ObjectReference 501. Each entry in this table is flagged as to whether it is considered verified or unverified.

If several objects are generally co-located, the tables 511 and 513 can be shared among ObjectReferences 511 referring to any of them. In such an embodiment, the ObjectReference refers to an object representing the VirtualProcess (or "object group") which contains the object referred to. The VirtualProcess object contains an identifier used to name the VirtualProcess, the table or tables of binding hints (tables 511 and 513) for all objects contained within the VirtualProcess and possibly other information used for locating the actual instantiation of the VirtualProcess.

Figure 10B:
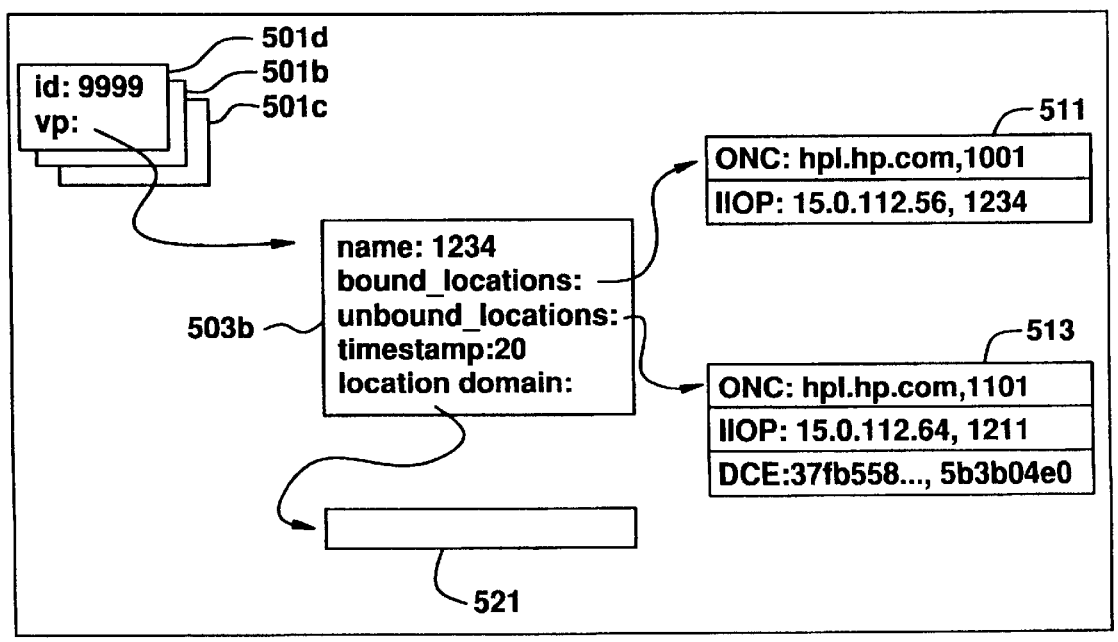

FIG. 10(b) is a block diagram showing an ObjectReference 501d with pointer to a Virtual Process 503b. The Virtual Process 503b contains the following pieces of information: its name, a reference to a verified_locations table 511, a reference to an unverified_locations table 513, a time stamp, and reference to a location domain 521.

The time stamp entry shown in Virtual Process 503b of FIG. 10(b) is optional. In an embodiment using the time stamp, the time stamp marks the unverified_location information. The time stamp may be a counter controlled by the locator associated with the Virtual Process. Each time the Virtual Process registers itself with the locator (i.e., registers itself at a new address) it is handed a time stamp number. When a process receives an ObjectReference 501 with one of these time stamps, the process only updates the unverified_location information if the ObjectReference's time stamp is greater than or equal to the time stamp associated with the current information. That technique overcomes the accidental overwriting of valid (but unverified) information with out-of-date information and also supports the deletion of stale entries corresponding to RPC_Transports 305 for which the re-registered Virtual Process has discontinued support. If the incoming time stamp supersedes the time stamp held for the Virtual Process, then the unverified information in the local table is cleared and replaced with the incoming information.

In an alternative embodiment, the hint information is retained pending proof that the hint is actually invalid.

Figure 11:
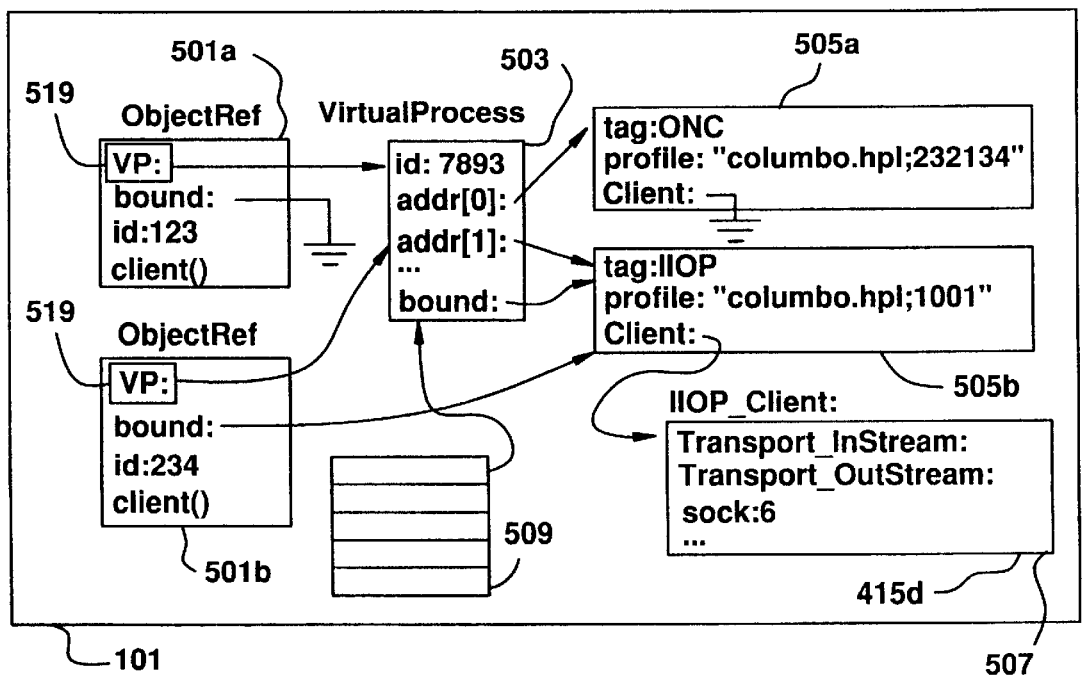
FIG. 11 is an exemplary block diagram of certain information maintained by a process.

FIG. 11 is an block diagram of an alternative logical layout of information associated with the ObjectReference 501 having a Virtual Process pointer 519. Objects 501a and 501b are ObjectReferences 501. Each contains a Virtual Process pointer ("VP") 519 which identifies the Virtual Process where the object resides. In the example of FIG. 11 the VP of both ObjectReferences 501a and 501b point to a Virtual Process record 503.

Each process maintains a Virtual Process Table 509 which is a list of Virtual Processes about which the process 101 has some knowledge. Each ObjectReference 501 refers to a VirtualProcess entry in the VirtualProcess Table. Associated with each VirtualProcess is a set of verified and unverified binding addresses. The ObjectReference 501 typically caches the last used binding address (i.e., the "bound profile" and a reference to the RPC_Client 311 that was bound using the "bound profile").

If the RPC_Client 311 reference is invalid, the profile is considered to be unbound. The profile may still be valid, but a new RPC_Client 311 reference must be constructed using the associated protocol's Info::bind() method. Some RPC_Transports 305 invalidate RPC_Clients 311 as a mechanism of reclaiming under-utilized resources (such as socket descriptors).

The verified profiles are profiles that have been successfully used by the process to communicate with objects in the specified target process.

The Virtual Process record 503 is identified by a unique identifier ("id"). The VP record 403 also contains a list of addresses ("addr[0]", "addr[1]", etc.) that each points to a tag object (e.g., objects 505a and 505b). Each profile corresponding to a tag object 505 pointed to by the VP record 403 may be used to access the objects belonging to the Virtual Process.

Locator

The communications framework 257 contains locators that processes may use to register and locate remote objects. A locator is a mechanism by which a process may obtain binding hints for an ObjectReference 501 and by which a process may register VirtualProcesses. The locator maps an identifier for the VirtualProcess (the VirtualProcessID) to an ObjectReference 501 for an object located in the Virtual-Process. This mapping is generally established when the VirtualProcess is activated. Although for well-known VirtualProcess identifiers, the mapping may also be established using a configuration tool. On activation, the VirtualProcess communicates with a locator to register its "name" (i.e., the the VirtualProcessID) as well as an ObjectReference 501 to one of the objects of the VirtualProcess.

When an ObjectReference 501 refers to a VirtualProcess for which the local binding hint information is invalid, the communications framework 257 will call a locator asking for an ObjectReference 501 associated with the VirtualProcessID.

If the VirtualProcess is registered with that locator, its current ObjectReference 501 is returned. Once received from the locator, the ObjectReference 501 will update (using the normal merge process (described below)) the local binding information for the VirtualProcess, and hence, the binding information for all objects located at the VirtualProcess.

There may be multiple locators in the communications framework 257. Which locator is used may be triggered by the VirtualProcessID. Locators may be organized hierarchically. Therefore, there is no requirement that there is one centralized locator.

Quality of Service

The apply() call may receive a CallInfo argument or an argument which refers to a CallInfo object. A CallInfo is an object (or a reference to an object) that is a collection of Quality of Service (QoS) parameters. Examples of such parameters include performance characteristics (e.g., throughput, latency), rebinding policy, payment mechanism, security policy, quality of protection (e.g., encryption, privacy, authentication, authorization lists), and concurrency policy.

Both the caller and callee may manipulate the CallInfo argument. For example the initiating process may set a performance metric requirement. In response to such a request, the callee process may provide a CallInfo parameter indicating its performance capabilities.

CallInfo is an extensible list of QoS parameters. One example of its use is where a client wishes to indicate to the server the maximum amount of time the server should take to complete a request (this is often called a server deadline). The client application can indicate a maximum timeout for the RPC_Client 311 and a maximum deadline (for the RPC_Server).

Decision Logic

The Stub object 303 contains a decision logic for determining which protocol to use in accessing the target object of a remote method invocation. In the alternative embodiment where the Stub 303 creates a Request object, the Request object contains the decision logic. In initiating a call, the Stub 303 may put in a request for a particular QoS requirement. An RPC_Transport 305 asserts to the Stub 303 which QoS level it can meet (for each QoS parameter it understands).

The decision logic uses the tag—value pair profiles to select a protocol with which it can connect to the target object associated with the ObjectReference 501 specified as the first argument in the apply() call. If the target object is accessible over multiple protocols (i.e., both the client and the server support more than one protocol in common), the protocol with the matching the Quality of Service (QoS) required by the Stub 303 is selected.

Upon receiving a remote method invocation on a target object from the Client 301, the decision logic of the Stub object 303 uses the profiles stored in the ObjectReference 501 corresponding to the target object to attempt establish a connection to the target object. If the ObjectReference 501 (or the Virtual Process to which the ObjectReference 501 belongs) contains confirmed profiles (e.g., entries in a verifed_locations table 511, entries flagged as being verified, or for which the binding pointer is not NIL) the decision logic selects the profile that comes closest to being able to deliver the desired QoS.

Figure 12:
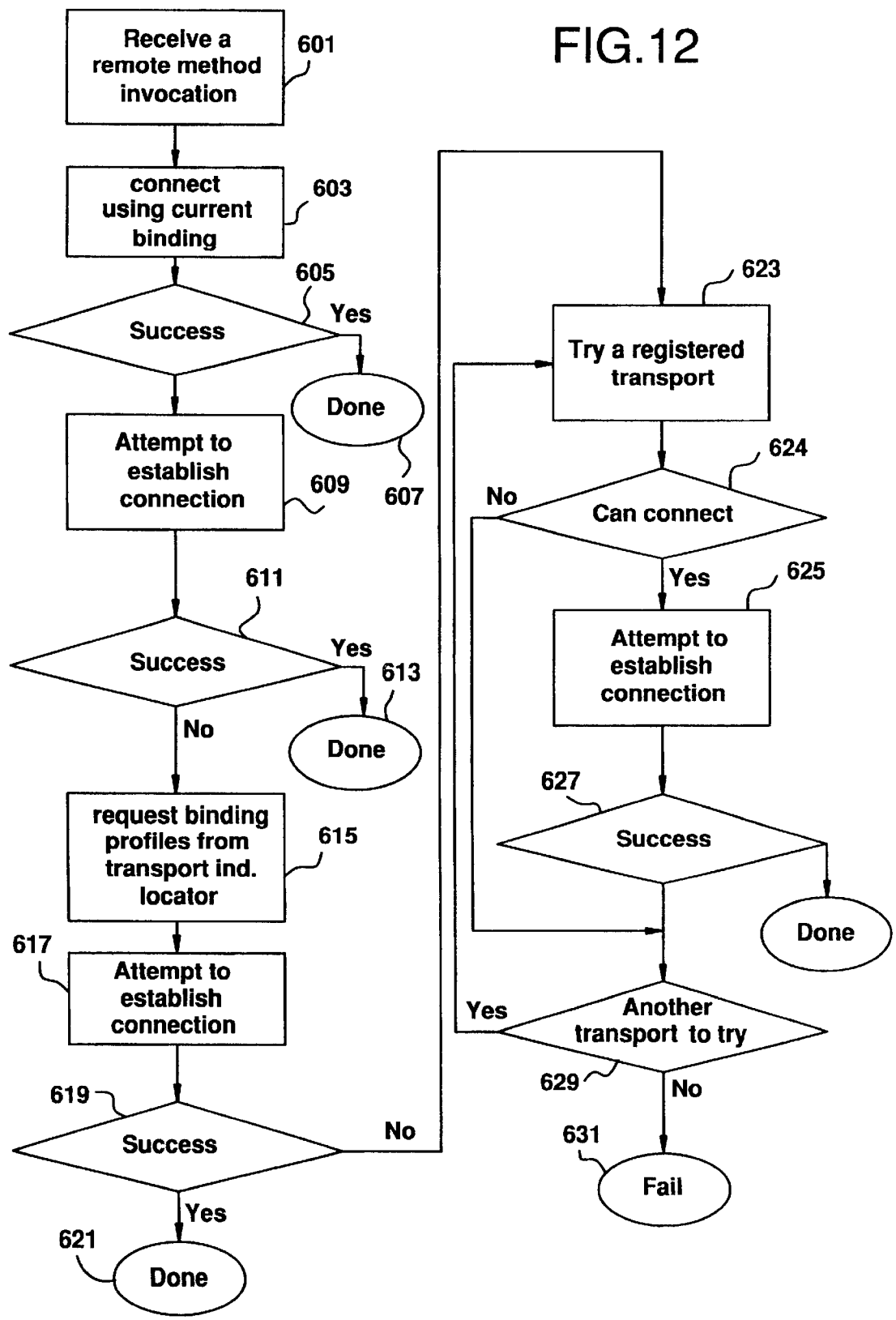
FIG. 12 is a flow chart illustrating the operation of the decision logic of the Stub.

FIG. 12 is a flow chart illustrating the operation of the decision logic of the Stub 303. The decision logic commences operation when the Stub object receives a remote method invocation, step 601. As a preliminary step, if there is a current binding for the ObjectReference 501, the decision logic attempts to establish the connection using that current binding, 603. If step 603 is successful, step 605, the procedure terminates with success, step 607. Otherwise, or if a connection cannot be established using the current binding, the decision logic, step 609, attempts to establish a satisfactory connection to the target object, step 603, using the procedure illustrated in FIG. 13.

Figure 13:
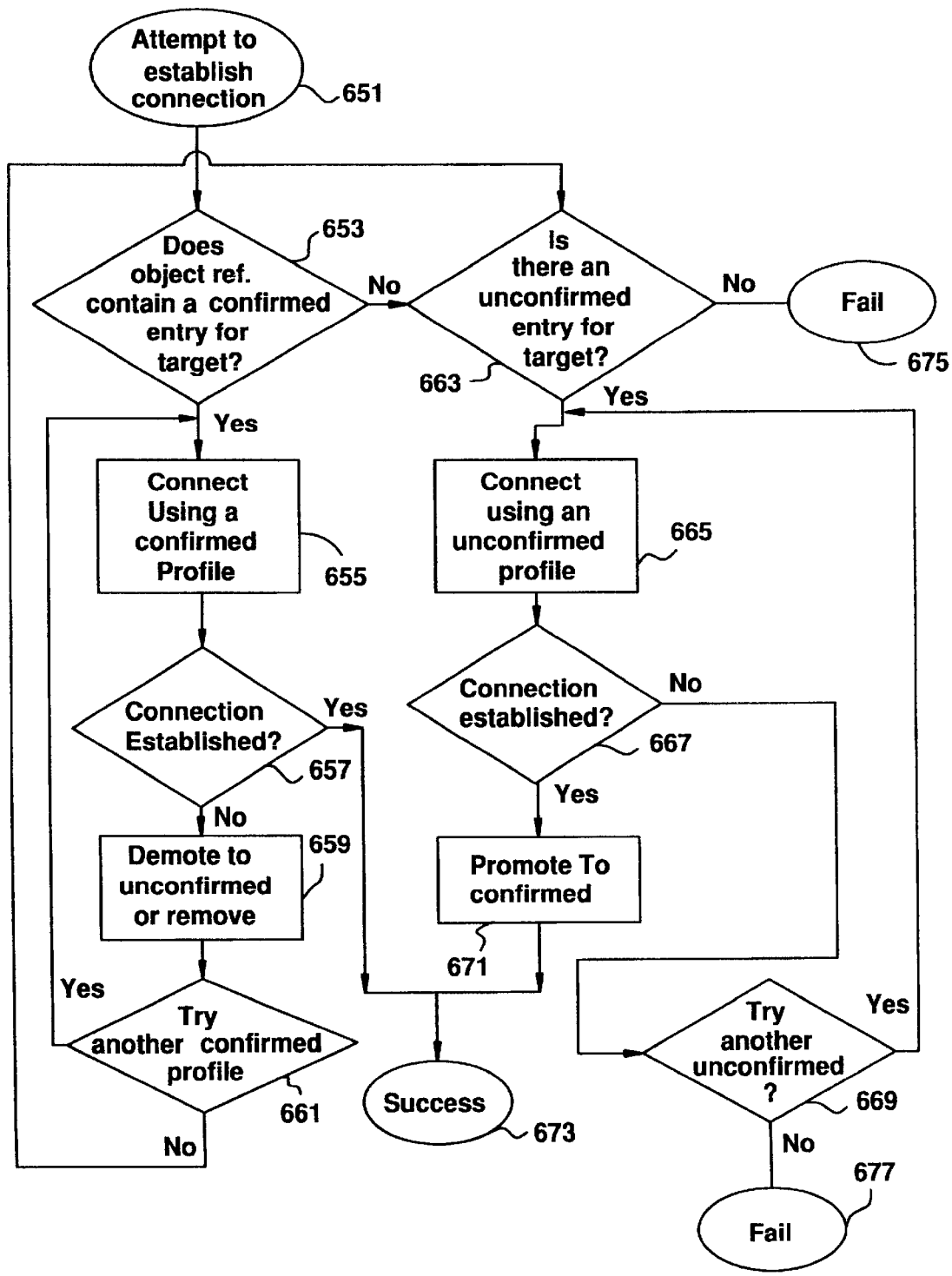
FIG. 13 is a flow chart illustrating the operation of the decision logic of the communication framework.

FIG. 13 is a flow chart illustrating the operation of the decision logic of the Stub object 303 to attempt to establish a connection. The decision logic has two possible approaches for selecting a profile to use to establish a connection to the target object, namely, using a confirmed profile or attempting to use an unconfirmed profile.

Element 651 illustrates the entry point to the procedure. In the first step, step 653, the decision logic determines whether or not there is a confirmed entry in the ObjectReference 501. The Stub 303 may also receive a QoS parameter. If such is the case, step 653, also includes the step of determining whether a confirmed profile expects to meet the required QoS.

If a confirmed entry does exist (and if that entry can provide the required QoS), a connection is attempted using the corresponding protocol and profile, step 655. That attempt is made by calling the bind() method of the Info object corresponding to the RPC_Transport 305 associated with the profile. The ObjectReference 501 (alternatively, the profile or the VirtualProcess referred to by the ObjectReference 501) is passed as a parameter. The bind() method returns a reference to an instance of the subclass of the RPC_Client interface associated with the RPC_Transport 305. The apply() method is invoked on that RPC_Client to execute the remote method invocation. In some embodiments, the RPC_Client may be cached as the current binding. If that connection is successful, step 657, the decision logic has finished its task, step 673.

If the profile in the confirmed entry does not result in an acceptable connection, step 657, the entry is demoted (i.e., by moving the entry from table 511 to table 513) or removed (by simply removing the entry from table 511), step 659. If another confirmed profile exists, step 661, the decision logic repeats steps 657, 659, and 661, otherwise, the decision logic attempts to use one of the unconfirmed entries. If there are no unconfirmed entries to try, step 663, the procedure returns indicating failure, step 675.

If there is an unconfirmed profile entry, step 663, the decision logic may attempt a connection using that entry, step 665. As long as there are unconfirmed profile entries in the ObjectReference 501 that the decision logic has not tried, it may attempt another, step 669. If one of the unconfirmed profile entries is used to establish the connection to the target object, that entry is promoted to confirmed, i.e., by moving the entry from table 513 to table 511 or in the alternative embodiment by flagging the entry as verified), step 671, and the decision logic has finished its task, step 673.

However, if the decision logic has failed to establish a connection using any of the unconfirmed entries, and there are no additional unconfirmed entries to try, step 669, the procedure returns indicating failure, step 677.

Returning to FIG. 12, if the procedure from FIG. 13, invoked in step 609, returns with a successfully established connection, step 611, the decision logic can terminate with success, step 613. Otherwise, the decision logic requests binding profiles for the ObjectReference 501 from a transport independent locator, step 615.

Having queried a locator and obtained an updated ObjectReference 501, the decision logic again attempts to establish a connection using the procedure of Figure, step 617. If on this attempt a connection was successfully established, step 619, the procedure terminates with success, step 621. Otherwise, if the decision logic failed to establish a connection with the binding information from the locator, step 619, the decision logic attempts making the connection by querying the various registered RPC_Transports 305 (e.g., those registered in the supported protocols list 417) to determine if one of those RPC_Transports 305 can establish the connection using an RPC_Transport dependent location mechanism, steps 623–629. In step 623, the decision logic queries an RPC_Transport 305 to determine if it can establish the connection. If the queried RPC_Transport 305 indicates that it can make the connection and meet any required QoS conditions, step 624, the decision logic attempts to establish the connection using the procedure of FIG. 13, step 625. If the decision logic successfully established a connection, step 627, the procedure terminates indicating that a communication channel has been established. Otherwise, if there are additional RPC_Transports 305 to try, step 629, steps 623–627 repeat for another RPC Transport 305.

If all RPC_Transports 305 have been queried and attempts have been made to establish a communication channel with all registered RPC_Transports 305 that indicate that the RPC_Transport 305 can be used to establish a connection to the target object, step 629, and no communication channel was established, then the decision logic returns with an error indication, step 631.

Alternatively, the loop 623, 624, 625, 627, 629 can be replaced by one in which each RPC_Transport 305 in the Info list is asked by the Communications Framework to provide new binding information. Each RPC_Transport 305 provides new binding information by querying protocol-specific location mechanisms, if such exists for the protocol supported by the particular RPC_Transport (some protocols, e.g., ONC RPC, have such pre-established location mechanisms). When all RPC_Transports 305 have been queried, the Communications Framework attempts to establish a connection using the procedure of FIG. 12, step 617.

The decision logic may, for example, if the QoS provided by an RPC_Transport 305 deteriorates during the course of the execution of a program, repeat the procedures of FIGS. 13 and 12 at any invocation of a method of a remote object. By so doing, the decision logic can dynamically change which RPC_Transport 305 and underlying protocol is used to effect the remote method invocation on an object.

In a preferred embodiment, one of the QoS parameters passed in the CallInfo argument to apply() is an instance of a BindingPolicy class. This BindingPolicy instance can be used to control how many options are explored before returning an error to the client. For example, the client may indicate that an error should be immediately returned if the connection the client was using has become invalid (e.g., the server has moved).

Obtaining an RPC-Client Reference

Each RPC_Transport 305 has complete control over the object address information used by that RPC_Transport 305. Some RPC_Transports 305 may use a distinct RPC_Client 311 instance for each ObjectReference 501. However, in most embodiments of the RPC_Transport 305, the RPC_Client 311 instances are shared among ObjectReferences 501 that refer to objects that are located in the same process or VirtualProcess. For example, the RPC_Transport 305 for the IIOP communication protocol may share its TCP/IP connection for all communication to objects located at the same VirtualProcess (barring security restrictions). The ObjectReference 501 is passed as a parameter to the RPC_Client::apply() function so that the RPC_Transport 305 can extract any ObjectReference 501 unique information, e.g., the object id. The RPC_Client 311 instance for the particular communication protocol manages binding information that is common to all objects in the process. An example of such information is which socket is used to communicate with the remote process.

Figure 14:
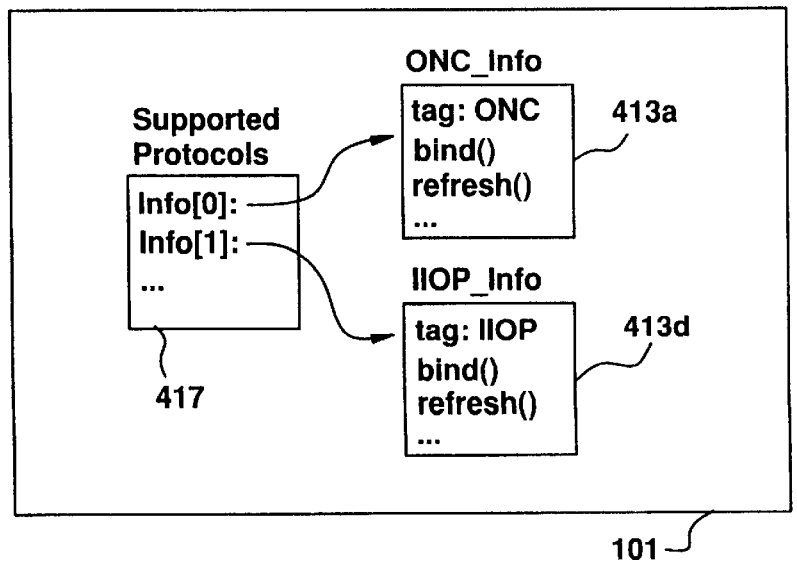
FIG. 14 is an exemplary logic diagram illustrating a Supported Protocols list and Info class instances for two protocols.

If the ObjectReference 501 is not bound to an RPC_Transport 305 when the application program issues the apply() call from the Stub 303, the tags (e.g., 505*a*, 505*b*) associated with the binding addresses ("addr[0]", "addr[1]", etc.) of the VirtualProcess 503 are matched against a list of communications protocols supported by the current process. Each process maintains a list of protocols supported by that process. FIG. 14 is a logic diagram illustrating an example of such a list 417 located on a process, e.g., process 101*a* or 101*b* of FIG. 1. Each item in the list 417 points to an Info object, e.g., 413*a* or 413*d*, for a protocol.

To dynamically replace communications protocols used by a process, the communications framework updates the entries in the supported protocol list 417. To load a new protocol, a new entry pointing to an instance of Info class for the new communications protocol is added to the supported protocol list 417. To delete a protocol, the entry in table 417 corresponding to that protocol is deleted from the supported protocol list 417.

Adding a binding address to an ObjectReference

The communications framework creates a new ObjectReference 501 for a target object whenever a target object is first registered with the communications framework. Optionally, the construction of the ObjectReference 501 may be delayed until it is needed, thus avoiding any unnecessary ObjectReference 501 creation. The created ObjectReference 501 is passed to other processes either by returning the ObjectReference 501 as a return parameter from a remote procedure call to another process, or by passing the ObjectReference 501 as a parameter in an outbound remote procedure call. Alternatively, the ObjectReference 501 can be made known to other processes by placing it in a shared medium, such as a shared disk file.

Caching of Location Information

ObjectReferences 501 may be distributed throughout a network 100. Thus, many processes 101 scattered about the network 100 may have ObjectReferences 501 to the same objects. Furthermore, objects may migrate from system to system within the network 100. The communications framework 257 provides a caching mechanism for caching location information whereby the hints stored in ObjectReference 501 and Virtual Process verified locations and unverified_locations table 511 and 513 are updated.

Cache Refresh Mechanism

Figure 15:
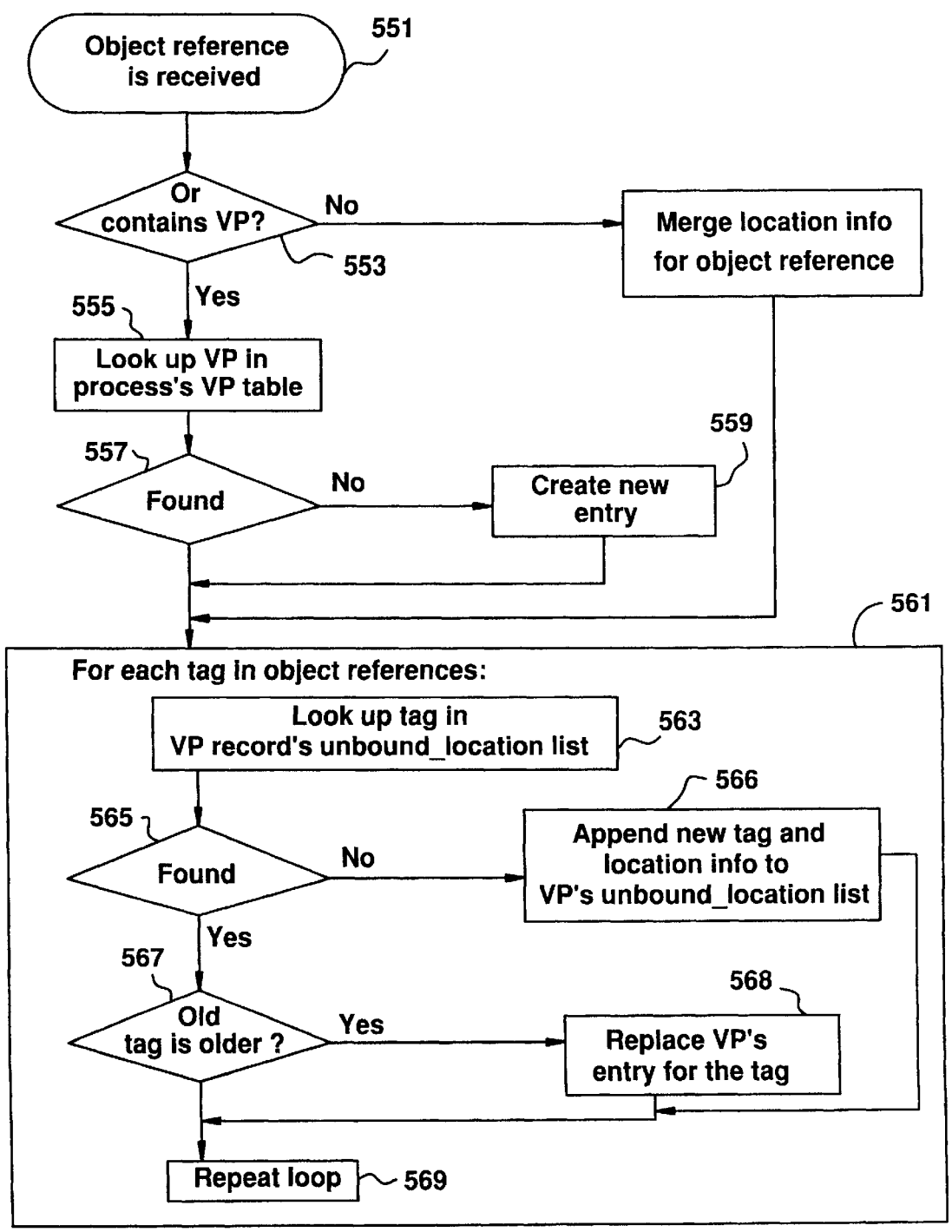
FIG. 15 is a flow chart illustrating the method for updating location information according to the invention.

FIG. 15 is a flow chart illustrating the method for updating location information according to the invention. Each ObjectReference 501, when presented to a process, e.g., by being transmitted from one process to another, contains the verified-locations table 511 and unverified_locations table 513 of that ObjectReference 501. An RPC_Transport 305 is not required to transmit the entire verified_locations and unverified_locations tables. When transmitting an ObjectReference 501, a process may, for example, transmit only the entries in the verified_locations table 511 or may only transmit the entries relating to certain protocols. When a process 101 receives an ObjectReference 501, step 551, the process 101 executes the procedure of FIG. 15. In one embodiment, when an ObjectReference 501 is sent from one process 101 to another process 101, if for any given protocol there is a tag in both the verified_locations table 511 and unverified_locations table 513, for that protocol, only the entries in the verified_locations table 511 are sent.

First it is determined whether the ObjectReference 501 refers to a Virtual Process, step 553. Each process maintains a Virtual Process Table 509 which is a list of Virtual Processes about which the process 101 has some knowledge. A process's Virtual Process Table 509 may be a list of Virtual Process records 503. Typically, a process is aware of a virtual processes if one or more ObjectReferences 501 point to that virtual process. If the process 101 receives an ObjectReference 501 which refers to a VirtualProcess which is already in the VirtualProcess table 509, then the VirtualProcess entry is is updated. In the case wherein the received ObjectReference 501 contains a virtual process pointer, the entry for the virtual process pointed to by the received ObjectReference 501 is retrieved from the Virtual Process Table 509, step 555.

Using Virtual Processes is not a requirement of the present invention. In some alternative embodiments all ObjectReferences 501 are associated with a Virtual Process. In other embodiments, no ObjectReferences 501 are associated with a Virtual Process. In yet other embodiments, some ObjectReferences 501 are associated with Virtual Processes, while others are not. The use of the VirtualProcess identifier allows optimizations in storing object location information as well as improves refresh/location performance.

If no entry is found for the Virtual Process in the Virtual Process Table 509, step 557, a new virtual process record 503 is created with empty verified_locations and unverified_locations lists 511 and 513, step 559. If there is an entry for the Virtual Process in the Virtual Process Table 509, step 557, binding information of the ObjectReference 501 is merged with the unverified locations 513 information.

To merge the binding information of the Received ObjectReference 501 with that of the Virtual Process or that of the Local ObjectReference 501 a number of steps 561 are repeated for each tag in the Received ObjectReference's 501 verified_locations list 511 and unverified_locations list 513. First, the tag is looked up in the unverified_locations list 511 of the Virtual Process or of the local ObjectReference 501, step 563. If an entry with the same tag is not found in the local unverified_locations list 513, step 565, the entry (tag and associated information) from the ObjectReference 501 is appended to the location information stored in the Virtual Process's unverified_locations list 513, step 566.

If an entry does exist in the locally held unverified_locations list 513, step 565, the time stamp—if any—of the Received ObjectReference's entry is compared to the time stamp—if any—of the local entry. If the local entry is older, step 567, the process replaces the entry in the local unverified_locations list with the entry from the Received ObjectReference 501, step 568, and the time stamp in the local entry is updated. If there is no time stamp on the ObjectReference 501, the binding information received with an incoming ObjectReference 501 is presumed by the process to be more recent than the locally held information.

The loop 561 is then repeated for the next tag/location entry in the Received ObjectReference 501, step 569.

In an alternative embodiment, the entries from the ObjectReference 501 may overwrite both entries in a local Virtual Process's unverified_locations 513 and verified_locations lists 511.

While the merging method described above in conjunction with FIG. 15 may occasionally overwrite valid unverified location information with stale information, in practice that rarely occurs. Usually, the information propagated from one process to another is relatively fresh (e.g., it has recently been used to establish a connection). If the information received is out of date, and it is allowed to overwrite better information, when the process fails to establish a connection using the information, the process only needs to query the locator once to obtain accurate information it can use to access all objects in the Virtual Process. Once that information (received from the locator) has been used to establish a connection, the information is moved to the verified_locations list 511 and therefore protected from casual overwrite. When that information in turn is propagated to other processes, it is a propagation of valid information.

In an alternative embodiment the entries of the unverified_locations list 513 include a relative time stamp. The time stamp is a counter controlled by the locator associated with the Virtual Process. Each time the Virtual Process registers itself with the locator (i.e., registers itself at a new address) the locator assigns a time stamp number to the Virtual Process. When a process receives an ObjectReference 501 which contains a time stamp, the process only updates the unverified_location information if the time stamp of the ObjectReference 501 is greater than the time stamp associated with the information currently held by the process for the same ObjectReference 501.

In one embodiment, if a time stamp overflows, the time stamp mechanism is disabled.

In an alternative embodiment, rather than maintaining the time stamps on a Virtual Process basis, time stamps are maintained on a per component (i.e., tag/profile) basis.

Example Remote Procedure Call Transport

Appendix A describes an RPC_Transport 305 that may be bound to the communication framework 257.

Adding a Remote Procedure Call Transport

Each RPC_Transport 305 instantiates a concrete class derived from the Info class. The Info class provides a registration mechanism such that each protocol-specific Info class can register its instance with the communications framework 257 using a global_registration() call. A preferred embodiment of the Info class is shown in the following C++ code:

```
class derived Info: public Info {
public:
    static int registrations ( );
    . . .
};
int global_registration (Base & val);
static int dummy_val=Derived::registration ( );
int Derived::registration ( ) {
    static Derived my_val;
    return global_registration (my_val);
}
```

When the RPC_Transport 305 is loaded, the static initialization of C++ initializes "dummy_val" by calling the Derived::registration ( ) function. The static member function initializes a function static instance of the derived class and calls an external global_registration() function global_registration() performs the actual registration of the RPC_Transport 305, for example, by creating an entry for the RPC_Transport 305 in the loaded RPC_Transports 305 table 417.

The object code for the instantiation of the Info class is linked into a process in three ways: (1) by linking to the RPC_Transport 305 at program build, by including a reference to the RPC_Transport 305 in command line linking the program, (2) by using the dynamic linking capabilities of an operating system under which the process is executing to dynamically link to the RPC_Transport 305 during the execution of the program, and (3) by using a capability of certain programming languages to dynamically load program code, e.g., JAVA's class loader.

Support of Legacy Applications—Half-transports

One strategy for utilizing the communication framework 257 with clients and servers that are not compliant with the communication framework 257 is to use transport-level gateways—also known as Half-Transports.

Figure 16:
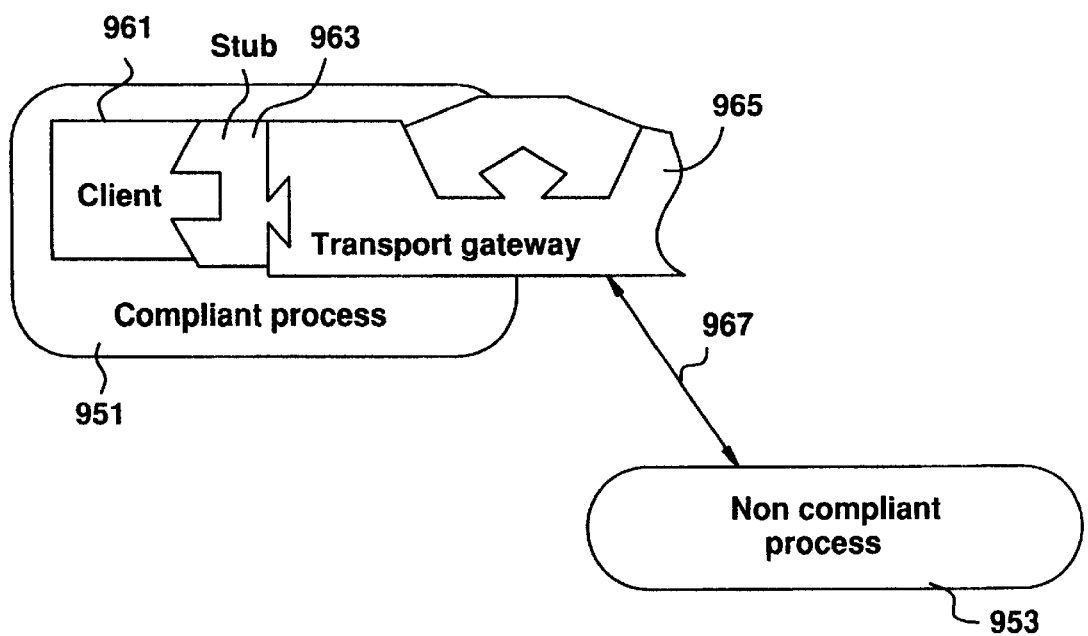
FIG. 16 is a block diagram illustrating using the communication framework of the present invention for communicating with applications that are not compliant with the communication framework of the present invention.

FIG. 16 is a block diagram illustrating the use of the communications framework 257 according to the invention to communicate between a process 951 that is written to apply the concepts of the present invention and a process 953 that is ignorant of the present invention. General examples of processes 953 include legacy applications (applications written prior to adoption of the communication framework 257) and applications not under the control of the same entity as process 951. A specific example may be a process that needs to communicate with a printer over a management interface such as SNMP.

An application program object, the client 961 issues a remote procedure call. The remote procedure call is issued to the Stub 963. The client 961 and Stub 963 behave and have the same structure and interfaces as the client 301 and Stub 303 of FIG. 4, respectively. The Stub 963, issues a distributed apply() call, with a self-marshaling ArgList, as described above, in conjunction with FIGS. 4 and 5, onto a transport-level gateway 965. The transport-level gateway 965 is an RPC_Transport 305 that exists on only one side of an inter-process communication link 967. The transport-level gateway 965 has two interfaces: one which is derived from the RPC_Transport abstraction layer 259 (which is shown to the compliant process 951) and a second which uses a private wire representation (which is shown to the non-compliant process 953).

Similarly, an RPC_Transport 305 in a compliant process may provide only the server side of a patricular protocol (and not define an RPC_Client subclass), accepting calls from non-compliant processes using the protocol and invoking methods on local, compliant implementation objects.

Server Dispatch Mechanism

The communications framework 257 partitions an incoming remote method call into two parts. The first part is an upcall from the communications framework 257 to allocate resources that will be used in the demarshaling and dispatching of an incoming message, step 5 of FIG. 5. The second part is an upcall to dispatch a demarshaled operation request to a particular object in the system, step 7 of FIG. 5.

The RPC_Transport 305 for each communication protocol includes a listener to receive incoming requests for the physical media supported by the protocol. In the example of FIG. 5, the listener is the RPC_Server 315. When the listener demarshals (calling upon the primitive marshalers 313) the object identifier, the Virtual Process identifier, and the operation name associated with the incoming request. The RPC_Transport 305 uses these pieces of information to create an IncomingCall instance derived from the following IncomingCall class:

```
class IncomingCall {
  public:
    IncomingCall (const Identifier& obj_id
      const Identifier& vp_uuid,
      const Identifier& oper,
      const Identifier& intf_id,
      CallInfo &info,
      ArgList * args=NULL);
    Identifier object_id ( ) const;
    Identifier VP_uuid ( ) const;
    Identifier intf_id ( ) const;
    CallInfo &info ( ) const;
    ArgList *get_args ( ) const;
    ImplBase * impl ( ) const;
    Boolean invoke ( ) const;
    void set_delegant (Impl Base *);
    void set_args (ArgList *);
    . . .
};
```

When the IncomingCall object is constructed, the communications framework searches internal tables to find the registered Skel (an instance of the ImplBase interface) which corresponds to the particular object and VirtualProcess ID's. Once the Skel has been identified, the constructor invokes its query_op() method to identify a dispatch function and allocate resources, including an ArgList query_op() is described in detail in the following sections. The ArgList object is self-marshaling/self-demarshaling. The RPC_Transport 305 calls upon the demarshaling routines of the incoming parameters to demarshal the parameter onto the created ArgList object.

An alternative embodiment does not have an IncomingCall class. In that embodiment, an RPC_Transport 305 asks the communications framework to identify the Skel and calls query_op() that Skel object directly.

Processing the Incoming Call

Each object that is callable from the communications framework implements the ImplBase interface, which declares the query_op( ) method. The signature for query_op( ) method is shown in the C++ code below:

```
typedef void (Dispatch_fn) (
  IncomingCall & val
);
class ImplBase {
public:
  dispatch_fn * query_op(
    IncomingCall & val)
) const
. . .
};
``` query_op( ) takes an IncomingCall argument which references the operation name, the identifier of the interface in which the operation is defined, a pointer (usually NULL) to an argument list, and a CallInfo object that contains information regarding the default dispatching policy of the underlying runtime. In the default case, query_op( ) is implemented by the autogenerated "skeleton" classes that are created from an interface specification (such as CORBA IDL).

The target object searches up its parentage for a class (inherited or delegated) that asserts that it supports the operation requested by the incoming remote procedure call. Associated with each operation name are (at least) three items: a dispatch function, a default threading policy, and a virtual function which can allocate default arguments for the operation. The dispatch function can convert the IncomingCall object that it receives as a parameter into a normal language specific method invocation or function call from a demarshaled argument list and pointer to a local object. The dispatch function is called (Step 7) from the invoke() method of IncomingCall which is called by the RPC_Server 315.

Alternatively, the IncomingCall class does not exist, and both query_op() and the dispatch function take distinct parameters for operation to be performed, the argument list, and the CallInfo object.

The communications framework 257 indicates to the IncomingCall object whether it has allocated memory for the argument list. If the query_op( ) method is invoked with an IncomingCall object which refers to a non-NULL argument list, then the communications framework 257 has allocated memory for the invocation request (this is an optimization to support shared-memory transports if the callee and caller agree on representation and the memory does not need to be copied (or marshaled and demarshaled) from caller to callee).

If the argument list reference in the IncomingCall is NULL (or an alternate memory representation is desired from that which has been provided), a virtual function specific to the operation being invoked is called to allocate a default set of arguments for the specified operation (in the preferred embodiment, this function is called create_args_operationname where operationname is replaced with the name of the operation requested by the incoming remote procedure call). The create_args_operationname returns references to memory locations for the arguments.

The arguments are self-marshaling/self-demarshaling (as discussed above) and are used by the communications framework 257 to accomplish zero-copy demarshaling directly into an application-specific representation.

To change the default representation for the arguments, a target object overrides the create_args_operationname method and returns an alternate argument list with elements that are also self-marshaling/self-demarshaling. In this manner, the application (in which the target object resides) can chose a more appropriate representation for the parameters (such as a compact representation for an X-Ray) rather than having to pay an extra memory copy to convert the default representation into an application specific form. The created self-demarshaling argument list for the new representation makes the same demarshaling calls as the overridden representation. However, the internal format can be quite distinct.

For the X-Ray example, suppose one of the received parameters is a compressed X-Ray image (often images are compressed for efficient transmission), but the representation desired by the target object is a decompressed image (suitable for viewing). The would create an Arg object capable of storing the decompressed image. If the default representation (obtained through inheritance from the target object's parentage) is for the compressed image, the target object would override the default create_args_operationname, so that the demarshaling function of the created Arg object would receive the compressed X-Ray image, but store the decompressed image, thereby avoiding storing (and copying) the undesired compressed representation.

By specifying the thread dispatch policy, the target object specifies to the communications framework 257 (specifically to the RPC_Server 315) whether the second upcall should be dispatched in its own thread of control or whether the current thread of control should be used. Concurrency restrictions can also be returned as part of the thread policy (e.g., only one thread is allowed to execute on an object or a specified maximum number of threads is specified).

The dispatch function returned by query_op() uses the object referred to by the impl() function as the object on which to invoke the specified method. That object defaults to being the target object specified in the construction of the IncomingCall but may be overridden by invoking the set_delegant() function of the IncomingCall.

The query_op( ) method may use the set_delegant() method of the IncomingCall to assert a reference to an object on which to execute the dispatch function. An alternative option available to the query_op() method is to create the delegant object based on the incoming call and thus get a simplified activation mechanism.

Using delegation of method invocation according to the invention (as described above) provides a useful hook. An application can register one object that receives all incoming calls (for example to check credentials), and then have this object delegate to the "true" object by returning the second object as the pointer. Also if the application code needs to pass information between the first upcall and the second upcall (such as the name of the operation being dispatched), it can create a second object that holds this information and return a pointer to that object. An application can have separate implementations based on QoS parameters (e.g., a secure implementation, a non-secure implementation). The communications framework 257 can use query_op to do load-balancing or transaction based work-queue assignment.

In a multithreaded system, an IncomingCall instance is protected from being destroyed prior to completion of the call. To achieve such protection, the IncomingCall object contains logic to guarantee that it is not prematurely destroyed while computations are active within the object. This protection is achieved by requiring that the target object call a function in its destructor which prevents further IncomingCalls from being created for this target and which blocks until there is no "active computation" (IncomingCall or other, local call) which referees to it. In a preferred embodiment, the constructor for the IncomingCall increments a synchronized counter in the target and the destructor decrements the counter. In an alternative embodiment, the argument passed to a set_delegant() method is capable of guaranteeing that the target object is not prematurely destroyed. The argument object may accomplish that result by considering itself as an active computation.

Once query_op( ) returns, the IncomingCall object has a self-demarshaling argument list, a preferred thread dispatch policy, a (potentially distinct) object pointer (that can be used for delegation purposes) and the dispatch function that will be upcalled with the demarshaled argument list and the object pointer.

The self marshaling/demarshaling ArgList supports a destroy( ) operation which will be upcalled by the infrastructure when the ArgList is no longer needed (i.e., when the operation completes and the IncomingCall instance is destroyed). Applications that have overridden the construction of the ArgList in order to use optimized memory managers can use the destroy( ) operation to return the memory to custom memory managers.

The main advantages of the query_op() mechanism is that communication protocols do not need to allocate or manage memory. The memory is allocated in application space (or by the application specific skeletons) and the application gets to chose the correct representation for the arguments.

This means that zero-copy pipelined demarshaling can be supported (i.e., a parameter in the ArgList can be directly demarshaled into memory from a socket without an intervening memory copy).

Although a specific embodiment of the invention has been described and illustrated, the invention is not to be limited to the specific forms or arrangements of parts so described and illustrated. For example, specific names have been associated with functions, classes, and objects of the communications framework of the present invention. These names are used herein so that the best mode can readily be understood by the reader. Implementations having other names, but equivalent functionality, are within the scope and spirit of the invention. Similarly, examples of computer code is illustrative in nature. Any other coding, whether in the C++ language (as the examples herein) or any other computer programming language, that is equivalent in function, must be considered within the scope of the invention. The invention is limited only by the claims.

Appendix A: Adding a New *RPC_Transport* 305

This appendix describes how to add a new *RPC_Transport* 305 based upon the abstract interfaces of the communications framework 257 discussed in the Detailed Description of Preferred Embodiments.

To add a new *RPC_Transport* 305, the *RPC_Transport* 305 writer should derive an *RPC_Transport* 305 dependent class from each of the abstract base classes (as described in the Detailed Description of Preferred Embodiments) and define behavior for each of the pure virtual functions.

Having created the new classes, the *RPC_Transport* 305 writer decides on a "tag" for the *RPC_Transport* 305, decides how location information is represented in the "cache", and register the *RPC_Transport* 305 with the communications framework 257 of Figure 3 using the *Info::register_instance()* function.

Once registered, the communications framework 257 downcalls the *RPC_Transport* 305 to create and parse *RPC_Transport* 305 cache information, to construct bindings to remote processes, and to invoke operations on remote objects.

1.1 A Simple *RPC_Transport* 305 (IOS)

To make this task more concrete, the following section describes an implementation of a simple *RPC_Transport* 305 that uses C++ iostreams on top of a TCP/IP socket. This implementation illustrates how an *RPC_Transport* 305 interacts with the communications framework 257.

1.1.1 IOS Wire Representation

An *RPC_Transport* 305 has full control over the wire-representation used to communicate between processes. To demonstrate this, the IOS *RPC_Transport* 305 uses ASCII messages composed of comma separated fields as its wire representation. A request from a client to a server is of the form

*<inst_uuid>,<vp_uuid>,<serial_number>,<operation>, <in_svc_ctx>,[<primitive>,]+* meaning that the message is composed of the stringified uuid for the object being addressed, the virtual process uuid in which the target object resides, the target's serial number (which is basically a hashed form of the *inst_uuid* and used for faster lookup), the operation name, and the *in_service_context* followed by a serialized form of the operation's IN and INOUT parameters.

The response from the server to the client is an ASCII message containing the <out_service_context> followed by a comma separated serialized form of either an exception or the operation's OUT and INOUT parameters.

1.1.2 IOS HintComponent

The IOS *RPC_Transport* 305 uses an *_IOP_HintComponent* registered with the enumeration *TAG_HP_IOS_HINT*. The contents of the hint is the string "*<inet_host>;<port>*"

where *inet_host* is the 8 byte internet address (expressed as the string representation of an unsigned long ), and the port that on which the server process is listening.

1.1.3 IOS Primitive Marshalers

The primitive marshalers are constructed by deriving from the two abstract base classes *Orblite::Transport::OutStream* and *Orblite::Transport::InStream* (in this Appendix Orblite is the name given to the communications framework 257 and *Orblite::Transport::OutStream* and *Orblite::Transport::InStream* correspond to the *OutStream* and *InStream* classes 411 and 409, respectively).

```
namespace IOS_Transport {
    class OutStream : public Orblite::Transport::OutStream {
        public:
            OutStream(int sock);
            ~OutStream();
            Boolean marshal(Boolean val);
            Boolean marshal(Short val) ;
            Boolean marshal(Long val) ;
            Boolean marshal(UShort val) ;
            Boolean marshal(ULong val) ;
            Boolean marshal(Char val) ;
            Boolean marshal(Octet val) ;
            Boolean marshal(Float val) ;
            Boolean marshal(Double val);
            Boolean marshal(_ENUM_TCKind val);
            Boolean marshal_backptr(ULong val);
            Boolean marshal_string(const char * val, ULong length);
            Boolean marshal_octets(const char * val,, ULong length);
            Boolean marshal(const TxType &val) ;
            void flush();
        private:
            ofstream pd_f;
    };
};
```

Table A-1. The IOS OutStream marshaler

The *IOS_Transport::OutStream* class declares that it implements the pure virtual methods of its base class plus a few extra methods which are used internally by the IOS *RPC_Transport* 305.

The constructor is used to attach an instance of the class to a socket. The *flush()* method is used to force any pending data that is buffered in the ofstream onto the socket, and the destructor releases the socket so it is not closed when the ofstream destructs.

The definition of these new methods appears below:

```
IOS_Transport::OutStream::OutStream(int sock) : pd_f(sock)
{}
IOS_Transport::OutStream::~OutStream() {
    pd_f.detach();
}
IOS_Transport::OutStream::flush() {
  pd_f.flush();
}
```

Table A-2. Attaching OutStreams to ofstreams

The marshal methods are fairly straight-forward and extremely similar to one another. A boolean value is marshaled as a character and _ENUM_TCKind_ is marshaled as a Long. The *marshal_backptr* is marshaled as a -1 followed by the offset. Marshaling of composite types (i.e., those derived from the *TxType* class 801) is implemented as shown in Table A-3).

```
Orblite::Boolean
IOS_Transport::OutStream::marshal(const Orblite::TxType &val)
{
    return val._marshal(*this);
}
```

Table A-3. Marshaling Orblite::TxType

The remaining primitives are marshaled by just using the streaming operators on the internal ofstream data member.

```
/ This form for Short, Long, UShort, ULong, Char, Octet, Float, Double

Orblite::Boolean
IOS_Transport::OutStream::marshal(Orblite::Short val)
{
    pd_f << val << ',';
    return (Orblite::Boolean)pd_f.good();
}
```

Table A-4. Implementing the Primitive Marshalers

The *marshal_string* method is implemented in terms of the *marshal_octets* method as shown in Table A-5

```
Orblite::Boolean
IOS_Transport::OutStream::marshal_string(const char *val,
                                         Orblite::ULong length)
{
    return marshal_octets(val, length);
}

Orblite::Boolean
IOS_Transport::OutStream::marshal_octets(const unsigned char *val,
                                         Orblite::ULong length)
{
    size_t len = (size_t)length; // this is unsafe if length>2^16
    pd_f.write(val, len);
    pd_f << ',';
    return (Orblite::Boolean)pd_f.good();
}
```

Table A-5. Implementing the string (and octets) Marshaler

The demarshaling class (i.e., *IOS_Transport::InStream*) is very similar to the *OutStream* class. It also has a constructor from a socket, keeps an internal ifstream data member, and releases the socket when the *InStream* is destructed. The primitive demarshalers invert the streaming operators as shown in Table A-6. The *demarshal_string* is implemented in terms of the *demarshal_octets* method which is shown in Table A-7.

```
Orblite::Boolean
IOS_Transport::InStream::demarshal(Orblite::Short &val)
{       char comma;
    pd_f >> val >> comma;
    return (Orblite::Boolean)pd_f.good();
}
```

Table A-6. Implementing the Primitive demarshalers

```
Orblite::Boolean
IOS_Transport::OutStream::demarshal_string(char *val,
                                           Orblite::ULong length)
{
    return demarshal_octets(val, length);
}

Orblite::Boolean
IOS_Transport::OutStream::marshal_octets(unsigned char *val,
                                         Orblite::ULong length)
{
    size_t len = (size_t)length; // this is unsafe if length>2^16
    pd_f.read(val, len);
    char comma;
    pd_f >> comma;
    return (Orblite::Boolean)pd_f.good();
}
```

Table A-7. Implementing the string (and octets) demarshaler

HP Docket 10960509-1

.1.4 IOS *Info* Class

The IOS *Info* class is a derived class of the *Orblite::Transport::Info* abstract base class. An instance of the *IOS_Transport::Info* class is registered with the communications framework 257 by using a technique of instantiation during C++ runtime static initialization.

```
namespace IOS_Transport {
  class Info : public Orblite::Transport::Info
  {
   public:
      Info();
      virtual ~Info();
      const Orblite::CallInfo &qos_info() const;
      const Orblite::Identifier &tag() const;
      Orblite::Transport::RPC_Server * server();
      _IOP_Profile bind(const Orblite::Object &obj,
                        Orblite::CallInfo & info);
   private:
      Client * bind(const Orblite::Identifier &vp_uuid,
                    const Orblite::String &binding_cache);
      static Info psd_instance;
  };
};
```

Table A-8. The IOS Info Class

The constructor for the class calls the *register_instance()* method on the base class (as shown in Table A-9). The private static data member is instantiated before *main()* is run, and thus the constructor for the *Info* class is called.

Using this trick, the *RPC_Transport* 305 is registered with the communications framework 257 without requiring the communications framework 257 or the application code to have an explicit reference to the IOS transport.

```
static _IOP_HintComponentFactory ios_hint_factory;
IOS_Transport::Info IOS_Transport::Info::psd_info;

IOS_Transport::Info::Info() {
    register_instance(this); // tell the communications framework 257
    about this
        _IOP_ComponentFactory::register_factory(TAG_HP_IOS_HINT,
                                                &ios_hint_factory);
}
IOS_Transport::Info::~Info()
{
    unregister_instance(this);
}
```

Table A-9. Using Static Initialization for *RPC_Transport* 305 Registration

The IOS *RPC_Transport's tag()* method merely returns a reference to a function static Identifier that contains the string "IOS". Similarly, the *server()* method constructs a function static instance of the *IOS_Transport::Server* class (see Section 1.1.6 on page 16). This instance is constructed the first time the *server()* method is called.

```
const Orblite::Identifier &
IOS_Transport::Info::tag() const
{
    static Orblite::Identifier my_id("IOS");
    return my_id;
}
Orblite::Transport::RPC_Server *
IOS_Transport::Info::server() {
    static IOS_Transport::Server my_server;
    return &my_server;
}
```

Table A-10. The IOS Info tag() and server() methods

The *qos_info()* method returns a *CallInfo* that contains a *PerformanceMetric* instance. The *PerformanceMetric* provides a very rough idea of the performance of the *RPC_Transport* 305.

```
const Orblite::CallInfo &
IOS_Transport::Info::qos_info() const
{
    static int init = 0;
    static Orblite::PerformanceMetric metric;
    static Orblite::CallInfo info;
    if (init == 0) {
        metric.bytes_per_second(200000);
        metric.rtt_magnitude(-3); // milliseconds
        info.add(metric.tag(), &metric);
    }
    return info;
}
```

Table A-11. Implementing the IOS Info Class

The most complicated method of the *IOS_Transport::Info* class is the *bind()* method. The *IOS_Transport::Info::bind()* method is called by the communications framework 257 when the core attempts to find a usable profile in an unbound object's interoperable object reference.

The *IOS_Transport* stores its binding information in an object's IOR as part of the *MultipleComponent* profile. A given IOR may have more than one *MultipleComponent* profile, so the binding logic for the IOS *RPC_Transport* 305 is to interate over all of the *MultipleComponent profiles*, and look for the IOS *RPC_Transport's* binding information in one of the hint components.

As shown in Table A-12 the Info::bind method iterates over each *MultipleComponent* profile in the object's IOR and returns the first profile that can be bound using the *bind_profile()* method.

```
_IOP_Profile
IOS_Transport::Info::bind(const _Orblite_Object &obj,
                          _Orblite_CallInfo &info) const
{
  _IOP_IOR ior = get_ior(obj);
  _IOP_Profile profile;
  if (ior == NULL) {
    return profile;
  }
  _IOP_ProfileIter iter =
        ior->profiles(_IOP_TAG_MULTIPLE_COMPONENTS);
  while(iter.current(profile)) {
    _IOP_MCProfile *mc_profile = _IOP_MCProfile::narrow(profile);
    if (mc_profile != NULL) {
        if (mc_profile->merged_info().rpc_client() != NULL){
            return profile;   // strange, we are bound
        }
        if(bind_profile(*mc_profile)) {
            return mc_profile->get_handle();
        }
    }
    iter.next();
  }
  return _IOP_Profile(); // return a null profile
}
```

Table A-12. Binding an IOR

```
Orblite::Boolean
IOS_Transport::Info::bind_profile(_IOP_MCProfile &mc_profile) const
{
    _IOP_Component comp
            =mc_profile.merged_info().component(TAG_HP_IOS_HINT);
    if (comp.valid()) {
      _IOP_HintComponent *hint_comp = _IOP_HintComponent::narrow(comp);
      if (hint_comp != NULL) {
          return bind_hint(mc_profile, *hint_comp);
      }
    }
}
```

Table A-13. IOP_Transport::Info::bind_profile()

The *bind_profile()* finds the hint component for the *IOS_Transport* and calls *bind_hint()* on the component.

```
Orblite::Boolean
IOS_Transport::Info::bind_hint(_IOP_MCProfile &mc_profile,
                               _IOP_HintComponent &hint_comp) const
{
  _IOP_OctetSeq hint = hint_comp->verified();
  if (hint.length() == 0) {
    hint = hint_comp->unverified();
    if (hint.length() == 0) {
        return _Orblite_FALSE;
    }
  } else {
    hint_comp->verified(_IOP_OctetSeq()); // clear the verified
    hint_comp->unverified(hint);
  }
  Orblite::Identifier vp_uuid = mc_profile.endpoint().as_identifier();

IOS_Transport::Client * clnt =
                IOS_Transport::Client::bind(vp_uuid, hint.as_string());
  if (clnt == NULL) {
    return _Orblite_FALSE;
  }
  mc_profile.merged_info().rpc_client(clnt);
  hint_comp->verified(hint);
  return _Orblite_TRUE;
}
```

Table A-14. Binding an IOR

The *bind_hint()* method extracts the binding information from the hint and asks the *IOS_Transport::Client* class to interpret the hint and return an instance of the *Client* bound to the server's virtual process. The instance of the *IOS_Transport::Client* is shared for all references to targets at the same virtual process address.

1.1.5 IOS Client Class

The IOS *RPC_Client* class is a derived class of the abstract *Orblite::Transport::RPC_Client* base class. The derived class adds a new constructor (which takes the socket file descriptor created by the *Info* class), and has two data members (which is used for marshaling and demarshaling arguments on the socket).

```
namespace IOS_Transport {
  class Client: public Orblite::Transport::RPC_Client
  {
    public:
        static Client *
            bind(const Orblite::Identifier &vp_uuid,
                const Orblite::String &transport_cache);
        virtual Orblite::Boolean
            apply( const Orblite::Object &obj,
                    const Orblite::Identifier &oper,
                    Orblite::ArgList &args,
                    Orblite::CallInfo & info);
    private:
        Client(int sock) : is(sock), os(sock) {};
        Orblite::Boolean
            get_response(Orblite::ArgList &args,
                            Orblite::CallInfo &info);
        Orblite::Boolean
            handle_exception(Orblite::ULong kind,
                _Orblite_Transport::InStream &is,
                Orblite::Environment &env);
        InStream is;
        OutStream os;
  }
};
```

Table A-15. The IOS Client Interface

The Client class is responsible for creating a binding to the remote virtual process, and for dispatching the *apply()* method.

.1.5.1 Implementing the *bind()* method

This simple *RPC_Transport* 305 uses the internet host address and the port number of the remote TCP/IP endpoint as its cache information. The task, therefore, of the *Client's* bind method 1 is to take the cache information and construct a bound TCP/IP socket to the remote host. If a failure occurs a NULL *RPC_Client* handle is returned.

```
IOS_Transport::Client *
IOS_Transport::Client::bind(const Orblite::Identiifer &,
                            const Orblite::Identifier &vp_cache_info)
{
    const char * in_str = cache_info.c_str();
    unsigned int port;
    unsigned long inetaddr;
    struct sockaddr_in saddr;

sscanf(in_str,"%lu;%u",&inetaddr, &port);
    memset(&saddr,0,sizeof(saddr));
    saddr.sin_family = AF_INET;
    saddr.sin_addr.s_addr = htonl(inetaddr);
    saddr.sin_port = port;
    int sock = socket(AF_INET, SOCK_STREAM, 0);
    if (connect(sock, &saddr, sizeof(saddr)) < 0) {
        return NULL;
    }
    return new Client(sock);
}
```

Table A-16. Binding to a Remote Process

The *RPC_Client* 311 handle that is returned is used by the communications framework 257 to communicate with any object that exists in the remote virtual process. It is important to remember that if the communications framework 257 is running threaded, there is a strong likelihood of simultaneous calls multiplexed over the same *Client* connection.

The first parameter to the *Client's* bind call is the *uuid* associated with the virtual process. Most *RPC_Transport* 305s use this identifier to verify that the remote process is indeed the one anticipated at the address. In this *RPC_Transport* 305, it is assumed that the cache information is valid.

5   1.1.5.2 Implementing *apply()*

In this simple *RPC_Transport* 305, the *apply()* method sends five parameters to the server: the stringified identifier for the remote implementation, a hash value for the stringified identifier, the operation to be performed, the total number of arguments in the *ArgList*, and finally the argument list itself. Each
10   of the parameters is asked to marshal itself onto the *OutStream* associated with the remote virtual process (see Table A-19)

```
Orblite::Boolean
IOS_Transport::Client::apply(const Orblite::Object &obj,
                     const Orblite::Identifier &oper,
                     Orblite::ArgList &args,
                     Orblite::CallInfo &info)
{
  Orblite::CallException *env = Orblite::CallException::lookup(info);
  Orblite::ServiceContexts *ctxs = Orblite::ServiceContexts::lookup(info);
if (env == NULL || ctxs == NULL) {
  return _Orblite_FALSE;
}
  if (obj._is_nil()) {
    env->exception(_Orblite_INV_OBJREF());
    return _Orblite_FALSE;
  }
  _IOP_Profile bound_profile =get_bound_profile(obj);
  _IOP_MCProfile *mcp = _IOP_MCProfile::narrow(bound_profile);
if (mcp == NULL) {
    env->exception(_Orblite_INV_OBJREF());
    return _Orblite_FALSE;
}
  const Orblite::Identifier &inst_id = mcp->object_key().as_identifier();
  const Orblite::Identifier &oa_uuid = mcp->endpoint_id().as_identifier();
  if (send_request(inst_id, oa_uuid, oper, ctxs->in_ctx(), args, *env)) {
    os.flush();
    return get_response(args, ctx, env);
  }
  return _Orblite_FALSE;
}
```

Table A-17. Implementing the apply() method

```
Orblite::Boolean
IOS_Transport::Client::send_request(const Orblite::Identifier &inst_id,
                          const Orblite::Identifier &oa_uuid,
                          const Orblite::Identifier &oper,
                          Orblite::ArgList &args,
                          Orblite::ServiceList in_ctx,
                          Orblite::CallException &env)
{
  Orblite::Boolean result = inst_id.marshal(os);
  if (result) result = oa_uuid.marshal(os);
  if (result) result = oper.marshal(os);
  if (result) result = in_ctx.marshal(os);
  if (result) result = args.marshal_in(os);
  if (!result) {
     env->exception(_Orblite_MARSHAL());
  return result;
  }
}
```

Table A-18. Implementing the send_request() method

```
Orblite::Boolean
IOP_Transport::Client::get_response(Orblite::ArgList &args,
                                    Orblite::ServiceContexts &ctxs
                                    Orblite::CallException &env)
{
   Orblite::ULong stat;
   result = is.demarshal(stat);
   if (result) {
        if (stat != _Orblite_Exception::NO_EXCEPTION) {
            result = handle_exception(stat, env);
            return result;
        }else {
            if (result) result = ctxs.out_ctx().demarshal(is);
            if (result) {
                result=args.demarshal_out(is);
                if (result) return _Orblite_TRUE;
            }
        }
    }
  }
  env.exception(_Orblite_MARSHAL());
  return _Orblite_FALSE;
}
```

Table A-19. Implementing the get_response() method

After the arguments have been marshaled to the server, the outgoing buffer is flushed and then the *Client* "blocks" waiting for a response from the server. The response is either an exception or the combination of a new hash value for the remote object identifier and the OUT parameters of the arglist.

In this simple implementation, the *Client* raises the MARSHAL exception if an error occurs. The completion status is set to MAYBE because this simple *RPC_Transport* 305 cannot tell if the server dispatched the request or not.

If an *RPC_Transport* 305 can tell whether the call failed before the server dispatched the request, it should indicate the completion status in the exception.

```
Orblite::Boolean
IOS_Transport::Client::handle_exception(Orblite::ULong kind,
                    Orblite::CallException &env)
{
  Orblite::Identifier ir_id;
  Orblite::Exception *ex;
  Orblite::Boolean result = ir_id.demarshal(is);
  if (result) {
    if (kind == _Orblite_Exception::SYSTEM_EXCEPTION) {
        ex = _Orblite_SystemException::find_exception(ir_id);
    } else {
        ex = env.find_exception(ir_id);
    }
    if (ex == NULL) {
        env.exception(_Orblite_UNKNOWN());
        return _Orblite_FALSE;
    }
    result = is.demarshal(*ex);
    if (result) {
        env.adopt_exception(ex);
        return _Orblite_TRUE;
    }
  }
  env.exception(_Orblite_MARSHAL());
  return _Orblite_FALSE;
}
```

Table A-20. Implementing the Client side handle_exception() method

1.1.6 IOS Server Class

The methods of the transport's *Server* class are intended to be used only by the communications framework 257 SOA class. The *Server* class is responsible for registering an endpoint (through which remote clients can reach objects in the local process) and for listening for incoming requests.

```
namespace IOS_Transport {
  class Server:public Orblite::Transport::RPC_Server
  {
  public:
     Server();
     ~Server();
     void run();
     void shutdown();
     void add_name(const Orblite::Identifier & endpoint_id,
                    _IOP_ComponentList &shared_components,
                    _IOP_ComponentList &merged_components);
     void register_impl(_SOA_Object & impl,
                    const Orblite::Identifier &object_key,
                    const Orblite::Identifier &endpoint_id,
                    _IOP_ComponentList &private_components,
                    _IOP_ProfileList &profiles);
     void unregister_impl(const Orblite::Identifier & object_key,
                    const Orblite::Identifier & endpoint_id);
     Orblite::String endpoint_spec();
     Orblite::Boolean blocking();
  private:
     Orblite::Boolean dispatcher(int sock);
     Orblite::Boolean handle_exception(const Orblite::Exception *e,
                    _Orblite_Transport::OutStream &os);
     void register_endpoint();
     Orblite::Boolean apply(InStream &is, OutStream &os,
                    _SOA_IncomingCall & request);
     Orblite::Identifier pd_id;
     unsigned long pd_hostid;
     unsigned short pd_port;
     Orblite::Boolean pd_running;
     int pd_main_sock;
     fd_set pd_fdset;
  };
};
```

Table A-21. The IOS Server class

In this simple implementation, the key methods are the constructor (which gets the local internet address), the *register_endpoint()* method (which constructs the initial binding socket) and the *Server::run()* method (which waits for incoming requests). The definition for the constructor and *register_endpoint()* methods are shown in Table A-22 and Table A-23.

```
IOS_Transport::Server::Server() {
    pd_main_sock = -1;
    pd_running = _Orblite_FALSE;
    char host[100];
    gethostname(host, sizeof(host));
    struct hostent * hent = gethostbyname(host);
    if (hent != NULL) {
        if (hent->h_addr != NULL) {
            pd_hostid = ntohl(*(unsigned long *) hent->h_addr);
        }
    }
}
IOS_Transport::Server::~Server() {
    close(pd_main_sock);
}
```

Table A-22. Constructing the IOS Server

```
void IOS_Transport::Server::register_endpoint() {
    struct sockaddr_in saddr;
    int len = sizeof(saddr);
    if (pd_main_sock == -1) {
        pd_main_sock = socket(AF_INET, SOCK_STREAM,0);
        memset(&saddr,0,len);
        saddr.sin_family = AF_INET;
        bind(pd_main_sock, &saddr, len);
        listen(pd_main_sock, 5);
        getsockname(pd_main_sock, &saddr, &len);
        pd_port = saddr.sin_port;
    }
}
```

Table A-23. Registering an Endpoint

The *register_endpoint()* method is called by the *add_name()* method. The *add_name()* method is guaranteed to be called by the communications framework 257 prior to a call to the *run()* method.

1.1.6.1 Implementing the *IOS::Server::run*() method

The *run()* method (shown in Table A-24) is a little complicated only because of the interaction with the underlying socket mechanism

```
void IOS_Transport::Server::run() {
    memset(&pd_fdset,0,sizeof(fd_set));
    register_endpoint();           // just in case we are called after a shutdown
    FD_SET(pd_main_sock, &pd_fdset);
    pd_running = _Orblite_TRUE;
    while (pd_running) {
        fd_set readfds = pd_fdset;
        int c = MSD_select(NOFILE,(int *)&readfds, NULL, NULL, NULL);
        if (c > 0) {
            if (FD_ISSET(pd_main_sock, &readfds)) {// new connect
                sockaddr_in saddr;
                int len=sizeof(saddr);
                int new_sock = accept(pd_main_sock, &saddr, &len);
                FD_SET(new_sock, &pd_fdset);
            }else {
                for (int i=0;i<NOFILE;i++) {
                    if (FD_ISSET(i, &readfds)) {
                        if (dispatcher(i) == _Orblite_FALSE) {
                            FD_CLR(i, &pd_fdset);
                            close(i);
                        }
                        break;
                    }
                }
            }else {
                if (c < 0 && errno != EINTR) {
                    fprintf(stderr, "Error in select %d\n", errno);
                    exit(errno);
                }
            }
        }
    }
}
```

Table A-24. The IOS::Server::run() method

The *run()* method initializes a set of file descriptors on which it listens for incoming calls. The main socket (which is used to *accept()* new connections) is added to the file descriptor set. A *select()* call is invoked which waits for an incoming message (or error) on one of the file descriptors.

If a connection message is received, a new socket is bound and added to the file descriptor set. If a pre-bound socket has data, this indicates that a client is attempting to execute a method on an object in the server's process space. The *dispatcher()* function is called for the specified socket descriptor to demarshal the arguments and invoke the specified operation (see Table A-25).

To keep the error handling and resynchronization of the streams simple we close the socket if an error occurs.

1.1.6.2 Implementing the *IOS::Server::dispatcher* method

In the dispatcher, the *RPC_Transport* 305 constructs instances of the *InStream* and *OutStream* for marshaling and demarshaling the incoming message. The arguments are demarshaled in the same order as they were marshaled by the *RPC_Client* 311.

```
Orblite::Boolean
IOS_Transport::Server::dispatcher(int sock) {
  InStream is(sock);
  OutStream os(sock);
  Orblite::ServiceContexts ctxs;
  Orblite::CallException env;
  Orblite::CallInfo info;
  info.add(ctxs.tag(), &ctxs);
  info.add(env.tag(), &env);
  Orblite::SerialNumber local_obj_key;
  Orblite::Identifier vp_uuid, oper, inst_uuid;
  Orblite::Boolean result = inst_uuid.demarshal(is);
  if (result) result = vp_uuid.demarshal(is);
  if (result) result = oper.demarshal(is);
  if (result) result = ctxs.in_ctx().demarshal(is);
  if (result) {
    _SOA_IncomingCall request(instr_uuid, vp_uuid, oper, NULL,
                   info);
    result = apply(is, os, request);
  }
  os.flush();
  }
  return result;
}
```

Table A-25. Implementing a dispatcher 1.1.6.3 Implementing server side *apply()*

In the actual *apply()* method, the server asks the _SOA_IncomingCall class to find a default *ArgList* (behind the scenes, *query_operation* has been called on *SOA_Object*). The arglist is then demarshaled and the request is invoked.

If an error occurred during the execution, then the exception is marshaled back to the client. Otherwise, the *ServiceOutContext* and the arglist are marshaled back to the client.

```
Orblite::Boolean
IOS_Transport::Server::apply(InStream &is, OutStream &os,
                             _SOA_IncomingCall & request)
{
  Orblite::CallInfo &info = request.info();
  Orblite::CallException *env = Orblite::CallException(info);
  Orblite::ServiceContexts *ctx = Orblite::ServiceContexts(info);
  Orblite::Boolean result;
  Orblite::ArgList *args = request.get_args();
  if (args != NULL) {
     result = arglist->demarshal_in(is);
     if (!result) {
             env->exception(_Orblite_MARSHAL());
         } else {
             result = request.invoke();
         }
     }
  }
  if (env->exception() != NULL) {
     result = handle_exception(env->exception_value(), os);
  } else {
     Orblite::ULong stat = _Orblite_Exception::NO_EXCEPTION;
     result = os.marshal(stat);
     if (result) result = ctx->out_ctx().marshal(os);
     if (result) result = arglist->marshal_out(os);
  }
  return result;
}
```

Table A-26. Implementing the server's apply() method

```
Orblite::Boolean
IOS_Transport::Server::handle_exception(const Orblite::Exception *e,
                            _Orblite_Transport::OutStream &os)
{
  if (e == NULL) {
    return _Orblite_FALSE;
  }
  Orblite::ULong stat = e->_kind();
  Orblite::Boolean result = os.marshal(stat);
  if (result) {
    Orblite::Identifier rep_id = e->_id();
    result = rep_id.marshal(os);
    if (result) {
      result = os.marshal(*e);
    }
  }
  return result;
}
```

Table A-27. Returning Server side Errors

The OUT arguments are only sent if no exception was set in the info parameter. The updated object key is returned to the client to improve the performance of subsequent calls to this object.

1.1.6.4 Registering the Endpoint

The final methods of the *Server* class are fairly uninteresting for this particular *RPC_Transport* 305. This *RPC_Transport* 305 does not do anything special for specific object implementations, and therefore the *register_impl* and *unregister_impl* calls are empty. The *blocking()* method returns TRUE indicating that this *RPC_Transport* 305 blocks the thread on which the *run()* method is executed.

```
void IOS_Transport::Server::register_impl(_SOA_Object &,
                const Orblite::Identifier &,
                const Orblite::Identifier &,
                _IOP_ComponentList &,
                _IOP_ProfileList &,
                const _IOP_SharedInfo &)
{} void
IOS_Transport::Server::unregister_impl(const Orblite::Identifier&,
                const Orblite::Identifier&)
{}
```

Table A-28. Adding per-object information to an IOR

```
Orblite::Boolean
IOS_Transport::Server::blocking() {
  return _Orblite_TRUE;
}
```

Table A-29. The Server::blocking method

The *endpoint_spec()* method returns a stringified form of the endpoint address (that was initialized by *register_endpoint()*).

```
Orblite::String
IOS_Transport::Server::endpoint_spec() {
  char buffer[100];
  sprintf(buffer, "%lu;%u", pd_hostid, pd_port);
  return buffer;
}
```

Table A-30. The Server::blocking method

The *shutdown()* method turns off the running flag and closes any open connections.

```
void IOS_Transport::Server::shutdown() {
  pd_running = _Orblite_FALSE;
  for (int i=0;i<NOFILE;i++) {
    if (FD_ISSET(i,&pd_fdset)) {
      if (i != pd_main_sock) {
        close(i);
      }
    }
  }
}
```

Table A-31. Initialization and Shutdown

Finally, the *add_name* method merely calls the *endpoint_spec()* method and adds the *endpoint_spec* as a *hint_component* to be added any constructed IOR.

```
void
IOS_Transport::Server::add_name(const Orblite::Identifier &vp_uuid,
                _IOP_ComponentList &,
                _IOP_ComponentList & merged_components)
{
  pd_id = vp_uuid;
  register_endpoint();
  _IOP_Component ios_hint_component(TAG_HP_IOS_HINT,
                      endpoint_spec());
  merged_components.append(ios_hint_component);
}
```

Table A-32. Adding Hint information for the Virual Process

HP Docket 10960509-1

We claim:

1. A communication framework supporting multiple communications protocols, comprising:
   a communications abstraction layer supporting multiple encoding formats, declaring a remote procedure call class, said remote procedure call class declaring an interface for an apply function, said apply function declaring a first parameter that refers to a potentially remote target object, a second parameter referring to a performable operation on the potentially remote target object, and a third parameter including arguments associated with the performable operation; and
   at least one remote procedure call transport providing an implementation for the apply function of the remote procedure call class.

2. The communication framework of claim 1 wherein a value supplied as the first parameter of the apply function is selective of at least one specific target object that is either remote or local.

3. The communication framework of claim 1, further comprising:
   a registration mechanism for registering the at least one remote procedure call transport to the communication framework.

4. The communication framework of claim 3 wherein the at least one remote procedure call transport is at least two remote procedure call transports and further includes a decision logic for receiving a request invoking the performable operation on the potentially remote target object and determining if any one of the at least two remote procedure call transports can communicate with the potentially remote target object, and if a plurality of the at least two remote procedure call transports can communicate with the potentially remote target object, the decision logic selects an appropriate remote procedure call transport from among the plurality of remote procedure call transports.

5. The communication framework of claim 4, wherein the decision logic uses a first remote procedure call transport on a first invocation of the performable operation associated with the at least one potentially remote target object and, optionally, uses at least one other remote procedure call transport on a subsequent invocation of any performable operation on the potentially remote target object.

6. The communication framework of claim 4, wherein the decision logic receives a Quality of Service parameter and uses the Quality of Service parameter to select the appropriate remote procedure call transport from among the plurality of remote procedure call transports.

7. The communication framework of claim 3, further comprising:
   a binding mechanism for establishing a binding between each of the at least one remote procedure call transports and the communication framework using at least one method selected from a set including:
   establishing the binding at compile time using a declaration,
   establishing the binding at run time, and
   establishing the binding at program link time.

8. The communication framework of claim 3, further comprising:
   an OutStream class for declaring an interface including at least one primitive marshaler and a composite data type marshaler, wherein each remote procedure call transport defines an implementation of the interface of the OutStream class for marshaling arguments associated with the performable operation.

9. The communication framework of claim 8, further comprising:
   a composite data type base class and at least one transport independent marshaler,
   wherein the implementation of the interface of the OutStream class recognizes a composite data type object deriving from the composite data type base class, and
   wherein each remote procedure call transport invokes selectively the at least one transport independent marshaler to marshal any composite data type object.

10. The communication framework of claim 3, further comprising:
    an Instream class for declaring an interface including at least one primitive demarshaler and a composite data type demarshaler,
    wherein each remote procedure call transport defines an implementation of the interface of the Instream class for demarshaling arguments associated with the performable operation.

11. The communication framework of claim 9, wherein the transport independent marshalers invoke the primitive marshalers to marshal any non-composite components of any composite data type object and to invoke a marshaling method of any composite components of any composite data type object.

12. The communications framework of claim 1, further comprising:
    a Stub object for accepting a function invocation intended for the potentially remote target objects and
    converting the function invocation into a protocol neutral invocation of the apply function, providing values for the parameters.

13. The communication framework of claim 1, further comprising:
    an Arg base class from which arguments associated with the performable operation derive, and wherein the arguments comprising the third parameter are each implemented by means of a class deriving from the Arg base class and wherein a collective value supplied for the third parameter of the apply function is implemented by a specific class derived from the ArgList base class defining a preferred marshaling for individual said arguments.

14. The communication framework of claim 13, wherein each class that derives from the ArgList base class has an associated marshaling method and pointers to zero or more objects derived from the Arg base class.

15. The communication framework of claim 13, further comprising:
    a composite data type base class and a transport independent marshaler for marshaling objects derived from the composite data type base class, wherein each argument has an associated marshaling function and an associated value, such that when the associated value of the argument is an instance of the composite data type base class, the transport independent marshalers marshal said associated value.

16. The communication framework of claim 1, further comprising:
    the at least one remote procedure call transport corresponding to a communications protocol, wherein the implementation of said apply function obeys substantially all requirements of the communication protocol.

17. The communication framework of claim 3, further comprising:

the abstraction layer including an Info class declaring a static variable initialized to a value of a registration function, wherein the registration function calls a global registration function and wherein each remote procedure call transport derives an Info object from the Info class, wherein at least one application process can link to the at least one remote procedure call transport and when a remote procedure call transport is loaded by the application process the global registration function is executed thereby registering the remote procedure call transport.

18. The communication framework of claim 17, wherein each application process further comprises:

a table of loaded remote procedure call transports, wherein the global registration function updates the table of loaded remote procedure call transports.

19. The communication framework of claim 3, further comprising:

a transport-level gateway having an interface derived from the remote procedure call class and operable to communicate with another application process that does not use an implementation of the remote procedure call class.

20. The communication framework of claim 19, wherein the transport-level computer code converting an invocation of the apply function into a format that said another application process is operable to receive; and computer code marshaling any specifically converted invocation of the implementation of the apply function onto a communications channel established between the transport-level gateway and the another application process.

21. The communication framework of claim 19, wherein the application process is an application process not adapted for interacting with the transport-level gateway.

22. A computer storage device comprising:

computer code for a communication framework supporting multiple communications protocols, including a remote procedure call class, said remote procedure call class declaring an interface for an apply function, said apply function declaring a first parameter referring to a potentially remote target object, a second parameter referring to a performable operation on the potentially remote target object, and a third parameter that includes arguments associated with the performable operation;

at least one remote procedure call transport providing an implementation for the apply function of said remote procedure call class;

an Instream class for declaring an interface including at least one primitive demarshaler and a composite data type demarshaler wherein each remote procedure call transport defines an implementation of the interface of the Instream class for demarshaling the arguments associated with the performable operation; and an OutStream class for declaring an interface comprising at least one primitive marshaler and a composite date marshaler, wherein each remote procedure call transport defines an implementation of the interface of the OutStream class for marshaling the arguments associated with the performable operation, and wherein a client makes a call on a function on a surrogate object such that the function converts the call into a protocol-independent invocation of one of the implementations of the apply function.

23. The device of claim 22, wherein the surrogate object is a Stub object for accepting a function invocation intended for the potentially remote target object and for converting the function invocation into a protocol neutral invocation of the implementation of the apply function, providing values for the parameters.

24. The device of claim 22, further comprising:

a composite data type base class and at least one transport independent marshaler;

an Arg, wherein each argument has an associated marshaling function and an associated value such that when the associated value of the argument is an instance of the composite data type base class the transport independent marshalers marshal the value, and wherein the implementation of the interface of the OutStream class operates to recognize a composite data type object that derives from the composite data type base class, and wherein each remote procedure call transport invokes selectively the at least one transport independent marshaler to marshal an associated composite data type object.

25. The device of claim 22, further comprising:

a composite data type base class and at least one transport independent demarshaler, wherein the implementation of the interface of the Instream class recognizes a composite data type object derived from the composite date type base class, and wherein each remote procedure call transport invokes selectively the at least one transport independent demarshaler to demarshal any composite date type object.

26. A method for executing a remote procedure call from a first process executing on a computer such that the call invokes a performable operation on a potentially remote target object in a second process executing on a potentially different computer, the method comprising:

in the first process, calling a function on a surrogate object which represents a reference to the potentially remote target object, wherein the remote procedure call seeks to invoke the performable operation on the potentially remote target object;

in the first process, mapping the remote procedure call to a communications protocol-neutral form including a reference to the potentially remote target object, a reference to the performable operation, and a reference to a collection of arguments associated with the performable operation;

transferring the communications protocol-neutral form from the first process to the second process; and in the second process, mapping the communications protocol-neutral form into an invocation of an implementation of the performable operation on the potentially remote target object.

27. The method of claim 26 further comprising:

creating the collection of arguments, each member of the collection of arguments being an argument object having a marshaling function;

registering a first remote procedure call transport in the first process;

registering a second remote procedure call transport in the second process; and establishing a connection between the first procedure call transport and the second procedure call transport, wherein the transferring the communications protocol-neutral form from the first process to the second process further comprises transferring the collection of arguments and wherein the second remote procedure call transport receives the collection of arguments.

28. The method of claim 26 further comprising:

connecting at least one remote procedure call transport to the first process, wherein the remote procedure call transport further comprises a concrete instance derived from an OutStream class specifying primitive marshalers and a marshaler for composite data types, wherein each member of the collection of arguments has an associated value;

creating the collection of arguments deriving from an Arglist class specifying an interface declaring a marshaling function; and marshaling each argument in the collection of arguments by invoking a marshaling function of the concrete instance derived from the OutStream class and providing as a parameter to said function, the value of the specific argument.

29. The method of claim 26 further comprising:

detecting that the first process and the second process are the same process, wherein the implementation of the function directly invokes the performable operation on the potentially remote target without mapping the remote procedure call to the protocol neutral form and without transferring the communication protocol neutral form and without mapping the communications protocol neutral form into the invocation.

30. The device as set forth in claim 22, comprising:

computer code for registering the at least one remote procedure call transport to the communication framework.

* * * * *